US012782780B2

United States Patent
Giron

(12) United States Patent
(10) Patent No.: US 12,782,780 B2
(45) Date of Patent: Nov. 3, 2026

(54) PATTERNED MOTHERBOARDS

(71) Applicant: SAGE Electrochromics, Inc., Faribault, MN (US)

(72) Inventor: Jean-Christophe Giron, Edina, MN (US)

(73) Assignee: SAGE Electrochromics, Inc., Faribault, MN (US)

( * ) Notice: Subject to any disclaimer, the term of this patent is extended or adjusted under 35 U.S.C. 154(b) by 273 days.

(21) Appl. No.: 18/591,840

(22) Filed: Feb. 29, 2024

(65) Prior Publication Data

US 2024/0361644 A1 Oct. 31, 2024

Related U.S. Application Data

(60) Provisional application No. 63/498,496, filed on Apr. 26, 2023.

(51) Int. Cl.
*G02F 1/1343* (2006.01)
*G02F 1/13* (2006.01)
(Continued)

(52) U.S. Cl.
CPC ........ *G02F 1/13439* (2013.01); *G02F 1/1309* (2013.01); *G02F 1/153* (2013.01); *G02F 1/1533* (2013.01); *G02F 1/155* (2013.01)

(58) Field of Classification Search
CPC .... G02F 1/13439; G02F 1/1309; G02F 1/153; G02F 1/1533; G02F 1/155; G02F 1/15
See application file for complete search history.

(56) References Cited

U.S. PATENT DOCUMENTS

| | | | |
|---|---|---|---|
| 8,164,818 | B2 | 4/2012 | Collins et al. |
| 8,289,610 | B2 | 10/2012 | Veerasamy |

(Continued)

FOREIGN PATENT DOCUMENTS

| | | | |
|---|---|---|---|
| CN | 103238107 | A | 8/2013 |
| CN | 103562962 | A | 2/2014 |

(Continued)

OTHER PUBLICATIONS

International Search Report and Written Opinion mailed Aug. 14, 2024 in PCT/US2024/025930, Sage Electrochromics, Inc., pp. 1-12.

(Continued)

*Primary Examiner* — Nathanael R Briggs
(74) *Attorney, Agent, or Firm* — Robert C. Kowert; Kowert, Hood, Munyon, Rankin & Goetzel, P.C.

(57) ABSTRACT

A method of manufacturing an electrochromic (EC) device is provided. The method includes receiving a substrate at a first facility. The substrate is coated with one or more layers of a plurality of layers. The substrate is patterned at the first facility to form a patterned substrate. Patterning the substrate includes identifying one or more areas for forming EC devices. The one or more areas of the patterned substrate are then electrically tested at the first facility. After electrically testing the patterned substrate, the patterned substrate is transported from the first facility to a second facility. At the second facility, after receiving the patterned substrate from the first facility, the one or more areas are cut from the patterned substrate to provide the EC device(s).

20 Claims, 22 Drawing Sheets

(51) Int. Cl.

| | |
|---|---|
| ***G02F 1/153*** | (2006.01) |
| ***G02F 1/155*** | (2006.01) |

(56) References Cited

U.S. PATENT DOCUMENTS

| | | | | |
|---|---|---|---|---|
| 2014/0340731 | A1 | 11/2014 | Strong et al. | |
| 2015/0097944 | A1 | 4/2015 | Palm et al. | |
| 2020/0398535 | A1 | 12/2020 | Collins et al. | |
| 2021/0103195 | A1* | 4/2021 | Kailasam | G02F 1/153 |
| 2021/0173278 | A1 | 6/2021 | Wang et al. | |

FOREIGN PATENT DOCUMENTS

| | | | |
|---|---|---|---|
| CN | 107209432 | A | 9/2017 |
| CN | 114556207 | A | 5/2022 |
| EP | 3234691 | | 7/2022 |

OTHER PUBLICATIONS

Office Action mailed Jun. 4, 2025 in Taiwanese Patent Application No. 113114424, Sage Electrochromics, Inc., 21 pages including translation.

* cited by examiner

PATTERNED MOTHERBOARDS

PRIORITY CLAIM

This application claims benefit of priority to U.S. Provisional Application Ser. No. 63/498,496, entitled "Patterned Motherboards," filed Apr. 26, 2023, and which is hereby incorporated herein by reference in its entirety.

FIELD OF THE DISCLOSURE

The present disclosure is directed to one or more smart glass units, and more specifically to various approaches for manufacturing one or more smart glass units.

BACKGROUND

Smart glass may be used to decrease heat transfer through a window and/or reduce the transmission of visible light to provide tinting or shading. A smart glass system including a smart glass (e.g., an electrochromic (EC) device, an electrochromic insulated glass unit (EC-IGU), a device with a glass that changes, for example tint, in response to an input, an electrical charge, and/or the environment) may be used to provide a decrease in solar heat gain (e.g., increase in insulation) through a transparent substrate and a reduction in visible light transmission through a transparent substrate (e.g., a window or glass pane). An EC device may include EC materials that are known to change their optical properties, such as coloration, in response to the application of an electrical potential, thereby making the transparent substrate more or less transparent or more or less reflective. An EC device can also change its optical properties such as optical transmission, absorption, reflectance and/or emittance in a continual but reversible manner on application of voltage. These properties enable the EC device to be used for applications like smart glasses, EC mirrors, EC display devices, and the like. EC glass may include a type of glass or glazing for which light transmission properties of the glass or glazing are altered when electrical power (e.g., voltage/current) is applied to the glass. EC materials may change in opacity (e.g., may changes levels of tinting) when electrical power is applied. Manufacturing of smart glass systems may have many inefficiencies.

SUMMARY

A method of manufacturing an electrochromic (EC) device is provided. The method includes receiving a substrate at a first facility. The substrate is coated with one or more layers of a plurality of layers. In some aspects, the substrate may be coated with the one or more layers of the plurality of layers at the first facility. The substrate is patterned at the first facility to form a patterned substrate. Patterning the substrate identifies one or more areas for forming respective EC devices of the one or more EC devices or for locating respective busbars for the one or more EC devices. The one or more areas of the patterned substrate are then electrically tested at the first facility. After electrically testing the patterned substrate, the patterned substrate is transported from the first facility to a second facility. At the second facility, after receiving the patterned substrate from the first facility, the patterned substrate is cut along a perimeter edge to provide the EC device. In some aspects, identifying the perimeter edge of the EC device includes performing one or more edge deletes through the one or more layers. In some aspects, patterning the substrate further includes performing one or more laser cuts through the one or more layers. In some aspects, after or during patterning the substrate, one or more busbars may be added to the one or more layers. The busbar may include temporary busbar or permanent busbars. In some aspects, patterning the substrate further includes adding one or more additional layers of the plurality of layers. In some aspects, electrically testing the one or more areas of the patterned substrate includes at least one of power cycling the one or more areas of the patterned substrate, testing the one or more areas of the patterned substrate for shorts, or repairing one or more shorts at the one or more areas of the patterned substrate. In some aspects, after power cycling and/or electrically testing, the one or more areas of the patterned substrate may become physically and chemically different compared to before power cycling and/or electrical testing. For example, as a result of power cycling and/or electrical testing, lithium may have moved back and forth between the layers. Some of that lithium may remain trapped in one or more of those layers. As a result, the one or more areas of the patterned substrate may maintain a different color in the clear state compared to the remainder of the patterned substrate. For example, the one or more areas of the patterned substrate may maintain a yellow hue in the clear state and the remainder of the patterned substrate may maintain no color hue. In some aspects, the method further includes after cutting the patterned substrate along the perimeter edge, grinding the perimeter edge of the EC device. Grinding the perimeter edge of the EC device may include a polishing, two-pass grinding technique.

Figure 1:
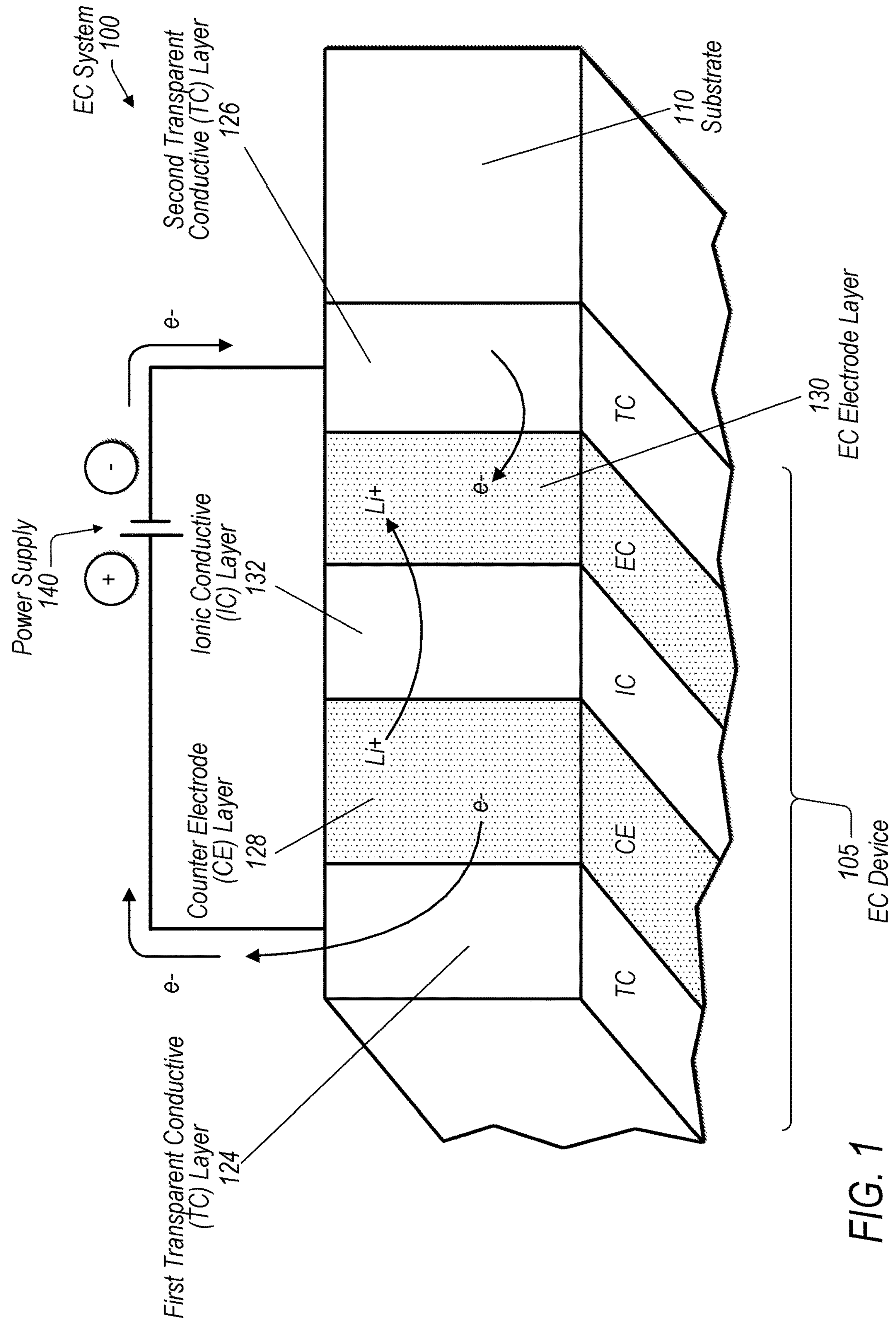
FIG. 1 illustrates a perspective view of an example EC system according to some aspects of this disclosure.

This specification may include references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value. It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will further be understood that the term "or" as used herein refers to and encompasses alternative combinations as well as any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. For example, the words "include," "including," and "includes" indicate open-ended relationships and therefore mean including, but not limited to. Similarly, the words "have," "having," and "has" also indicate open-ended relationships, and thus mean having, but not limited to.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Whenever a relative term, such as "about", "substantially" or "approximately", is used in this specification, such a term should also be construed to also include the exact term. That is, e.g., "substantially straight" should be construed to also include "(exactly) straight". As used herein, the terms "about", "substantially", or "approximately" (and other relative terms) may be interpreted in light of the specification and/or by those having ordinary skill in the art. In some examples, such terms may as much as 1%, 3%, 5%, 7%, or 10% different from the respective exact term.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. Any headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must).

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Smart glass may be used to decrease heat transfer through a window and/or reduce the transmission of visible light to provide tinting or shading. A smart glass system including a smart glass (e.g., an electrochromic (EC) device, an electrochromic insulated glass unit (EC-IGU), a device with a glass that changes, for example tint, in response to an input, an electrical charge, and/or the environment) may be used to provide a decrease in solar heat gain (e.g., increase in insulation) through a transparent substrate and a reduction in visible light transmission through a transparent substrate (e.g., a window or glass pane). An EC device may include EC materials that are known to change their optical properties, such as coloration, in response to the application of an electrical potential, thereby making the transparent substrate more or less transparent or more or less reflective. An EC device can also change its optical properties such as optical transmission, absorption, reflectance and/or emittance in a continual but reversible manner on application of voltage. These properties enable the EC device to be used for applications like smart glasses, EC mirrors, EC display devices, and the like. EC glass may include a type of glass or glazing for which light transmission properties of the glass or glazing are altered when electrical power (e.g., voltage/current) is applied to the glass. EC materials may change in opacity (e.g., may changes levels of tinting) when electrical power is applied. Manufacturing of smart glass systems may have many inefficiencies. Some of the inefficiencies may be overcome by forming a plurality of different smart glass systems with the different lengths and widths on a single substrate to best utilize the available area of the substrate. Subsequently the substrate may be coated with a plurality of layers forming an EC stack. The smart glass systems may then be patterned before being electrically tested and before being cut away from each other sharing the same substrate and into individual smart glass system.

FIG. 1 illustrates a perspective view of an example EC system 100 according to some aspects of this disclosure. The EC system 100 may include one or more same or similar features as the features described with respect to or illustrated in FIGS. 2, 3, 4, 5, 6, 7, 8, 9, 10, 11, 12, 13, 14, 15, 16, 17, 18, 19, 20, 21, and 22. For example, the EC system 100 may include and/or be manufactured using one or more same or similar features as the features described with respect to the method 200 described with respect to FIG. 2, the method 300 described with respect to FIG. 3, the method 400 described with respect to FIG. 4 and/or the method 1400 described with respect to FIG. 14. The EC system 100 may include one or more same or similar features as the features described with respect FIGS. 5, 6, 7, 8, 9, 10, 11, 12, 13, 15, 16, 17, 18, 19, 20, 21, and 22. FIG. 1, as with the other included figures, is shown for illustrative purposes and does not limit either the possible embodiments of the present invention or the claims.

In this example, the EC system 100 may include an EC device 105 secured to a substrate 110. The EC device 105 may be a non-limiting an example of a smart glass or smart glass unit as provided herein. The EC device 105 may include a thin film which may be deposited on to the substrate 110. The EC device 105 may include a first transparent conductive (TC) layer 124 and a second TC layer 126 in contact with the substrate 110. In some aspects, the first TC layer 124 and the second TC layer 126 may be, or may include, one or more transparent conductive oxide (TCO) layers. The substrate 110 may include one or more optically transparent materials, e.g., glass, plastic, and the like. The EC device 105 may also include a counter electrode (CE) layer 128 in contact with the first TC layer 124, an EC electrode layer 130 in contact with the second TC layer 126, and ionic conductor (IC) layer 132 in-between (e.g., "sandwiched" between) the CE layer 128 and the EC electrode layer 130. The EC system 100 may include a power supply 140 which may provide regulated current or voltage to the EC device 105. Transparency of the EC device 105 may be controlled by regulating density of charges (or lithium ions) in the CE layer 128 and/or the EC electrode layer 130 of the EC device 105. For instance, when the EC system 100 applies a positive voltage from the power supply 140 to the first TC layer 124, lithium ions may be driven across the IC layer 132 and inserted into the EC electrode layer 130. Simultaneously, charge-compensating electrons may be extracted from the CE layer 128, may flow across the external circuit, and may flow into the EC electrode layer 130. Transfer of lithium ions and associated electrons from the CE layer 128 to the EC electrode layer 130 may cause the EC device 105 to become darker—e.g., the visible light transmission of the EC device 105 may decrease. Reversing the voltage polarity may cause the lithium ions and associated charges to return to their original layer, the CE layer 128, and as a result, the EC device 105 may return to a clear state—e.g., the visible light transmission of the EC device 105 may increase.

As described herein, a smart glass or device such as the EC device 105 of FIG. 1 may receive a charge (e.g., a voltage) for controlling a tint of the smart glass. For example, an electrical charge may be provided to a smart glass to increase a level of tint (e.g., darken) of the smart glass. As another example, an electrical charge may be provided to a smart glass to maintain a level of tint of the smart glass. As yet another example, an electrical charge may be provided to a smart glass to decrease a level of tint of the smart glass. As another example, an electrical charge may be provided to a smart glass to clear a tint of the smart glass.

Figure 2:
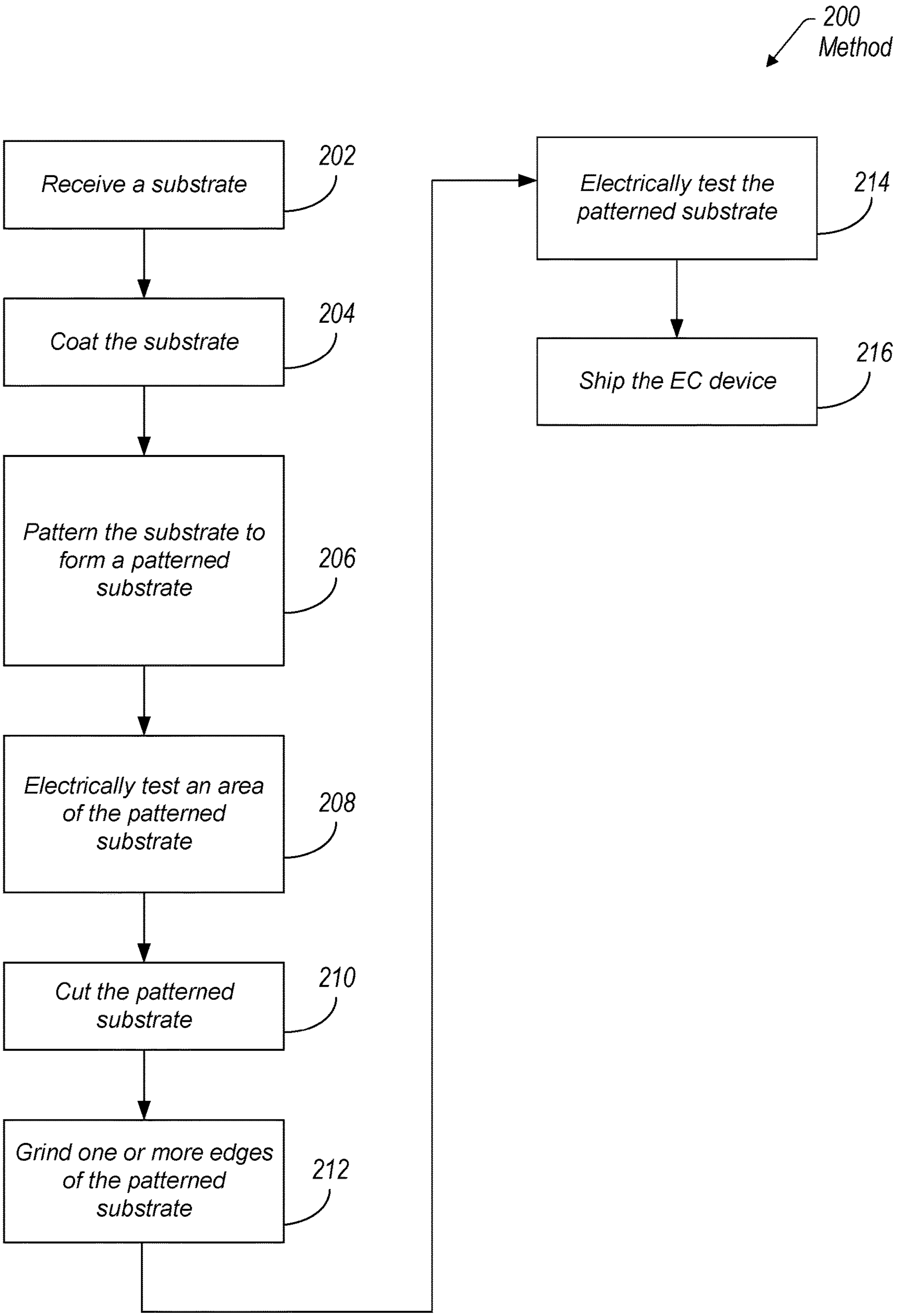
FIG. 2 illustrates a block diagram of an example method according to some aspects of this disclosure.

FIG. 2 illustrates a block diagram of an example method 200 according to some aspects of this disclosure. In some aspects, the method 200 may be implemented using the system 100 illustrated in FIG. 1, the system 100 illustrated in FIGS. 5, 6, 7, 8, 9, 10, 11, 12, 13, 15, 16, 17, 18, 19, 20, 21, and 22. One or more steps and/or one or more aspects described with respect to FIG. 2 may be include with and/or include one or more steps and/or one or more aspects of the method 300 described with respect to FIG. 3, the method 400 described with respect to FIG. 4, and/or the method 1400 described with respect to FIG. 14. FIG. 2, as with the other included figures, is shown for illustrative purposes and does not limit either the possible embodiments of the present invention or the claims.

At step 202, a substrate (e.g., a motherboard) may be received, for example, by an assembly line or manufacturing facility. The substrate may be coated with one or more layers (e.g., the second TC layer 126, the EC electrode layer 130, and/or the IC layer 132) or may be received or provided without any layers so that coating may be subsequently performed. At step 204, the substrate may be coated with one or more layers of a plurality of layers. The plurality of layers may constitute an EC stack or a partial EC stack. For example, the substrate may be coated with one or more layers of a plurality of layer such as the layers described with respect to the EC system 100 illustrated in FIG. 1. For instance, the substrate may be coated with one or more layers including the second transparent conductive (TC) layer 126, the electrochromic (EC) electrode layer 130, the ionic conductive (IC) layer 132, the counter electrode (CE) layer 128, and/or the first TC layer 124 as shown in FIG. 1. In some aspects, the substrate may be coated with a full stack forming the layers of an EC device. For example, the substrate 110 may be coated with the first TC layer 124, the CE layers 128, the IC layer 132, the EC layer 130, and/or the second TC layer 126. In some aspects, the substrate may be coated with a partial stack forming a portion of an EC device. For example, the substrate 110 may be coated with the second TC layer 126 and the EC layer 130.

At step 206, the substrate may be patterned to form a patterned substrate. Patterning may identify one or more areas for forming respective EC devices of the one or more EC devices on the substrate and/or for locating respective busbars for the one or more EC devices. For example, prior to shipping the substrate from one facility to another and/or prior to cutting the substrate into one or more EC devices, the patterning may identify one or more areas for forming respective EC devices of the one or more EC devices on the substrate and/or for locating respective busbars for the one or more EC devices. In some aspects, patterning the substrate may include performing one or more cuts through the one or more layers coated on the substrate. For example, patterning the substrate may including performing one or more cuts to isolate electrical current (e.g., at least partially isolate electrical current, restrict electrical current) through one TC layers (e.g., the first TC layer 124, the second TC layer 126) and/or through one of EC electrode layer 130 or the CE layer 128. As described further herein, these cuts may include a first cut (e.g., first cut 602 illustrated in FIG. 6) and/or a fourth cut (e.g., fourth cut 908 illustrated in FIG. 9). As another example, patterning the substrate may including performing one or more cuts for positions one or more busbars through one or more layers. As described further herein, a third cut (e.g., the third cut 806 illustrated in FIG. 9) may be used to position a busbar (e.g., the first busbar 1010*a* illustrated in FIG. 10) through the one or more layers.

In some aspects, the one or more cuts may include one or more laser cuts through the one or more layers. For example, one or more of a first cut (e.g., the first cut 602 illustrated in FIG. 6), a second cut (e.g., the second cut 704 illustrated in FIG. 7), a third cut (e.g., the third cut 806 illustrated in FIG. 8), a fourth cut (e.g., the fourth cut 908 illustrated in FIG. 9), and/or a fifth cut (e.g., the fifth cut 1212 illustrated in FIG. 12) may be made using one or more laser cuts. In some aspects, different lasers may be used for different cuts. For example, a first cut (e.g., the first cut 602 illustrated in FIG. 6) may be made using about a 10 ps 515 nm (green) laser and a spot size of about 80 μm and may be used for electrically isolating a bottom TC layer (e.g., the second TC layer 126). As another example, a second cut (e.g., the second cut 704 illustrated in FIG. 7) may be made using about a 30 ns 1064 nm (NIR) laser and a spot size of about 100 mm (top hat) and may be used for forming edge delete areas. As another example, a third cut (e.g., the third cut 806 illustrated in FIG. 8) may be made using about a 1.0 ns 515 nm (green) laser and a spot size of about 30 μm and may be used for placing a busbar (e.g., the first busbar 1010*a* illustrated in FIG. 10). As another example, a fourth cut (e.g., the fourth cut 908 illustrated in FIG. 9) may be made using about a 1.0 ns 515 nm (green) laser and a spot size of about 30 μm and may be used for electrically isolating a top TC layer (e.g., the first TC layer 124). As another example, a fifth cut (e.g., the fifth cut 1212 illustrated in FIG. 12) may be made using about a 1.0 ns 515 nm (green) laser and a spot size of about 30 μm and may be used for isolating the plurality of layers.

In some aspects, patterning the substrate may include adding one or more additional layers of the plurality of layers. For example, before patterning, the substrate may be coated with the second transparent conductive (TC) layer 126, the electrochromic (EC) electrode layer 130, the ionic conductive (IC) layer 132. During patterning, the counter electrode (CE) layer 128, and/or the first TC layer 124 may be added or stack on top of the second TC layer 126, the EC electrode layer 130 and the IC layer 132. This may be done to perform one or more cuts through the second TC layer 126, the EC electrode layer 130 and the IC layer 132 for electrical isolation of the second TC layer 126.

Figure 10:
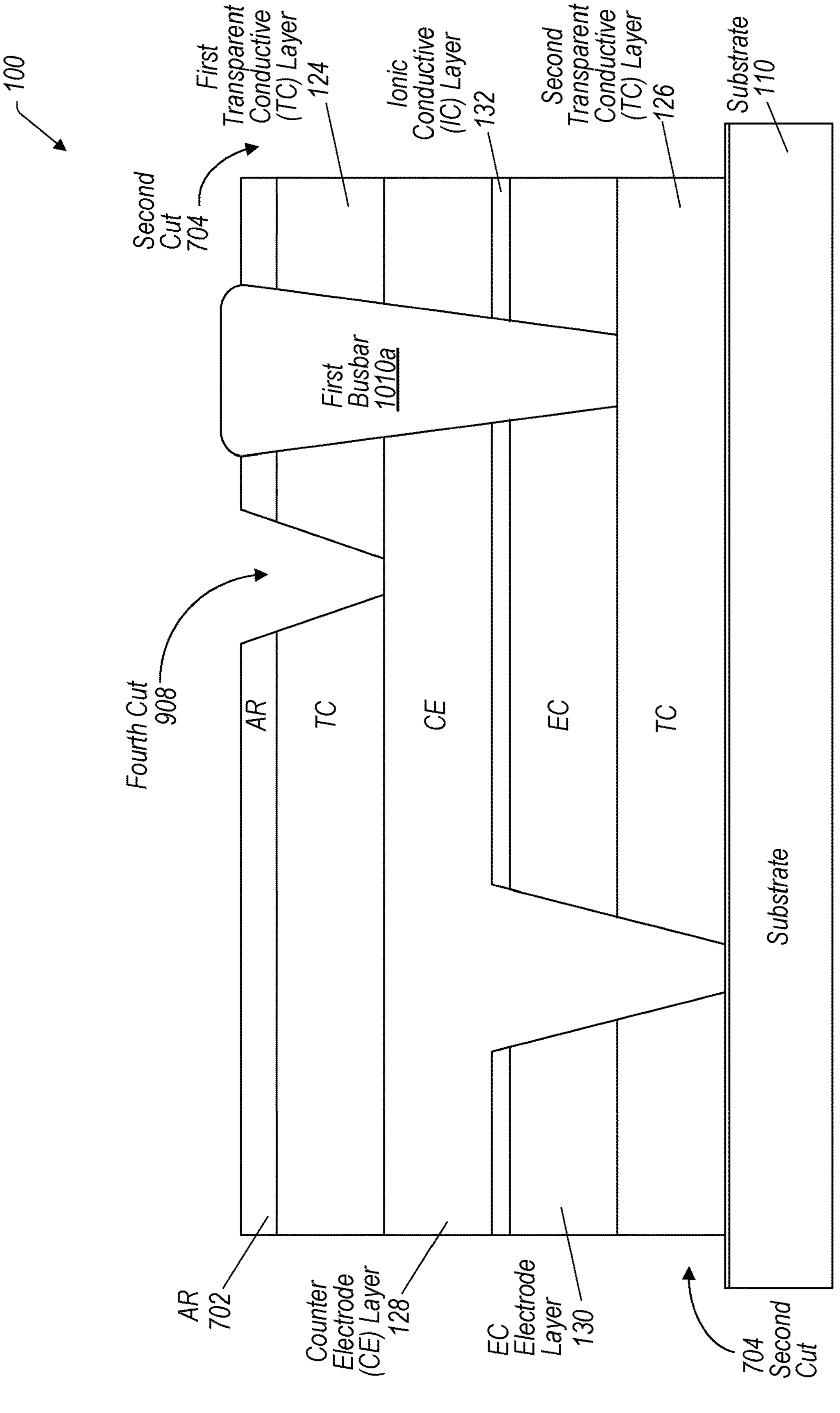
FIG. 10 illustrates a block diagram of an example system according to some aspects of this disclosure.
Figure 11:
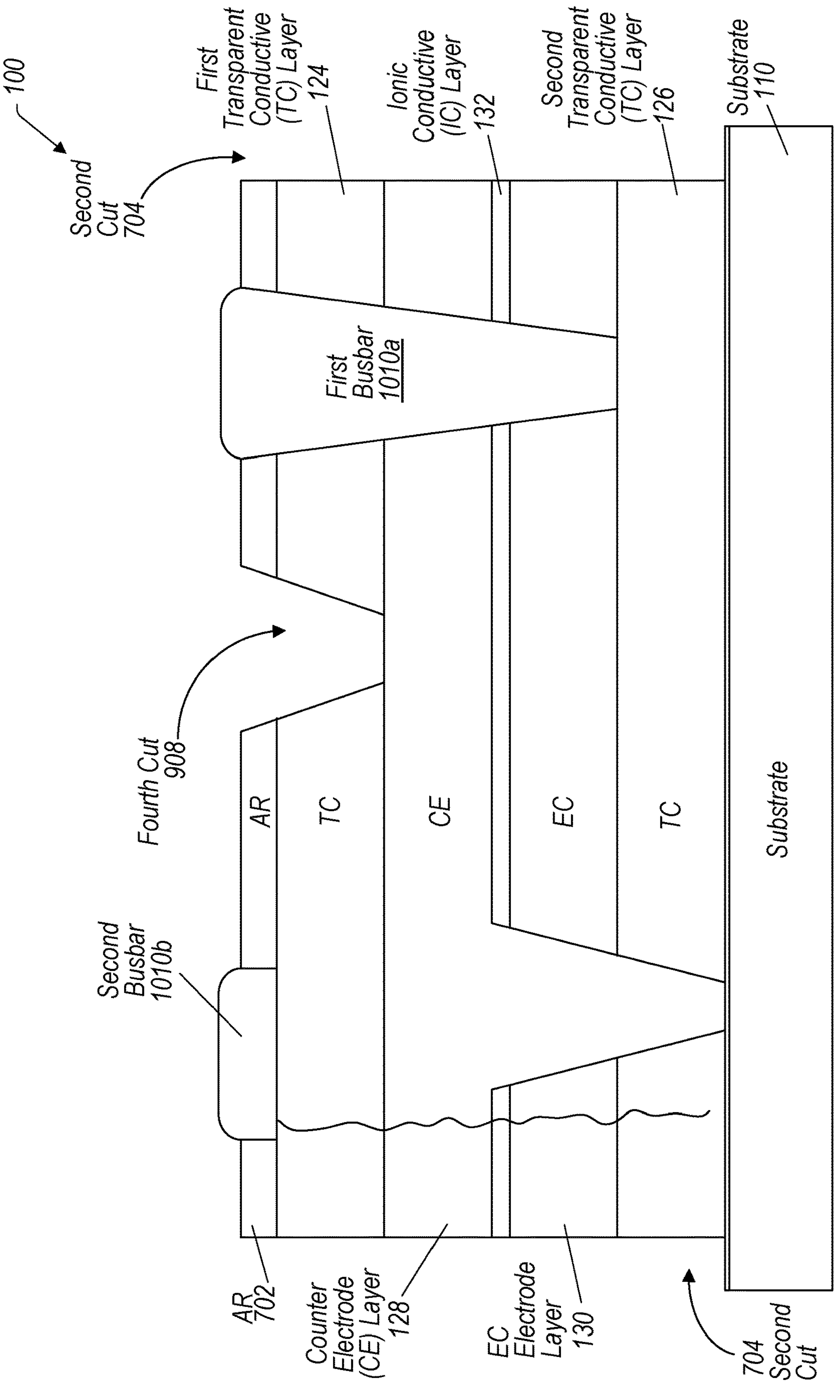
FIG. 11 illustrates a block diagram of an example system according to some aspects of this disclosure.

In some aspects, after patterning the substrate and/or while patterning the substrate, one or more busbars may be added to one or more of the layers. For instance, prior to shipping the substrate from one facility to another facility and/or prior to cutting the substrate into one or more EC devices, respective busbars for the one or more EC devices may be mounted to the substrate. For example, a first busbar (e.g., the first busbar 1010*a* illustrated in FIG. 10) may be positioned (e.g., via one or more cuts) through one or more layers of the plurality of layers positioned on the substrate. The first busbar may be used to provide electrical current to a bottom TC layer (e.g., the second TC layer 126 as illustrated in FIG. 10). As another example, a second busbar (e.g., the second busbar 1010*b* illustrated in FIG. 11) may be positioned over one or more layers of the plurality of layers positioned on the substrate. The second busbar may be used to provide electrical current to a top TC layer (e.g., the second TC layer 124 as illustrated in FIG. 11). In some aspects, one or more of the busbars may be permanent busbar that are included with the EC device as a final product for shipping. In other aspects, one or more of the busbars may be temporary busbars which may be used, for example, for electrical testing as described herein, and may be subsequently removed from the EC device and replaced with permanent busbars before shipping. Additionally, or alternatively, one or more busbars may be substituted with one or more electrical lines or connections (e.g., wires) positioned through one or more layers for electrical testing as described herein. The electrical lines or connections may be subsequently removed and replaced with busbars as described herein.

It should be noted that in some aspects, that the coating and patterning of the substrate may be performed as separate sequential processes. For example, the substrate may be coated with one or more layers of the plurality of layers and may include at least one cut and may subsequently have one or more additional cuts performed through one or more layers. In some aspects, the coating and the patterning of the substrate may be performed together or may be intertwined with each other. For example, the substrate may be coated with one or more layers, receive one or more patterning aspects as described herein, be coated with a remainder of the plurality of layers, and subsequently receive one or more other patterning aspects as described herein. In addition, after the substrate is coated and patterned, the substrate may receive a firing process, for example, to cure the plurality of layers stacked on the substrate.

At step 208, an area of the patterned substrate may be electrically tested. For instance, the one or more areas for forming respective EC devices of the one or more EC devices may be electrically tested. For example, busbars may be positioned on or in the patterned substrate for each of the one or more areas identified during patterning. The busbars may be then be used to electrically test the respective areas of the substrate. The respective areas of the one or more areas may be individually electrically tested prior to shipping the substrate from one facility to another facility or prior to cutting the substrate into the one or more EC devices. As described herein at least with respect to FIG. 14, electrically testing the one or more areas of the patterned substrate may include power cycling the one or more areas of the patterned substrate, testing the one or more areas of the patterned substrate for shorts, and/or, when necessary, repairing one or more shorts at the one or more areas of the patterned substrate. In some aspects, after power cycling and/or electrically testing, the one or more areas of the patterned substrate may become physically and chemically different compared to before power cycling and/or electrical testing. For example, as a result of power cycling and/or electrical testing, lithium may have moved back and forth between the layers. Some of that lithium may remain trapped in one or more of those layers. As a result, the one or more areas of the patterned substrate may maintain a different color in the clear state compared to the remainder of the patterned substrate. For example, the one or more areas of the patterned substrate may maintain a yellow hue in the clear state and the remainder of the patterned substrate may maintain no color hue. During a cutting process as described further herein, the layers located at some or all of the remainder of the patterned substrate may be discarded or removed from the substrate. Additionally, or alternatively, the short repair process may create a hole in part of one or more layers as a result of laser repairs.

At step 210, the patterned substrate may be cut to separate the EC device from a remainder of the substrate. For example, after electrically testing the respective areas of the one or more areas and/or after shipping the substrate from one facility to another facility, the substrate of the EC device may be cut along the one or more identified perimeter edges of at least one area of the one or more areas for forming a respective EC to provide a single EC device or a plurality of distinct EC devices. In some aspects, one or more layers of the patterned substrate may be removed based on the identified perimeters. The one or more layers of the patterned substrate that may be removed or discarded from some or all of the remainder of the patterned substrate outside the one or more areas for forming EC device(s). In some cases, one or more layers of some of the one or more areas may also be removed or discarded in order to define the shape of a respective EC device. In some aspects, cutting the substrate along the one or more identified perimeter edges may be performed to trim the edges of the EC device so that the substrate is a same size and shape as the one or more layers stack thereon. Additionally, cutting the substrate along the one or more identified perimeter edges may be performed to separate the EC device from one or more other EC devices (e.g., other one or more stack layers) adjacent to the EC device. For example, the substrate may be used for a plurality of EC devices such that the one or more identified perimeter edges may receive one or more cuts to separate the EC device from one or more other EC devices from the same substrate.

At step 212, one or more edges formed from cutting the one or more perimeter edges may be grinded. For example, the one or more edges may be grinded using a "C" shaped grinding wheel and a one pass grinding technique. Additionally, or alternatively, the one or more edges may be grinded using an aerospace "C" shaped grinding wheel and a two-pass grinding technique. The two-passes may include a course grinding pass and a fine grinding pass. Additionally, or alternatively, the one or more edges may be grinded using polished technique including a two-course grinding pass, one fine grinding pass, and a stone grinding pass for a mirror finish. Grinding the one or more perimeter edges may be used to strengthen the EC device. At step 214, the patterned substrate (e.g., the EC device), after being cut, may be electrically tested again. For example, the patterned substrate may be power cycled, tested for shorts, and/or, when necessary, receive one or more repairs for identified shorts. At step 216, the patterned substrate (e.g., the EC device) may be shipped, for example, to a customer and/or to one or more locations along a supply chain. It should be understood that the method 200 described herein with respect to FIG. 2 may be performed in a single facility.

Please note that the functional block(s) described herein are illustrated in FIG. 2 in merely one example arrangement. In other embodiments, the techniques and functionality described above may be performed using different steps in different orders or may be grouped into a different number of steps or may be performed as a single method without distinct steps.

Figure 3:
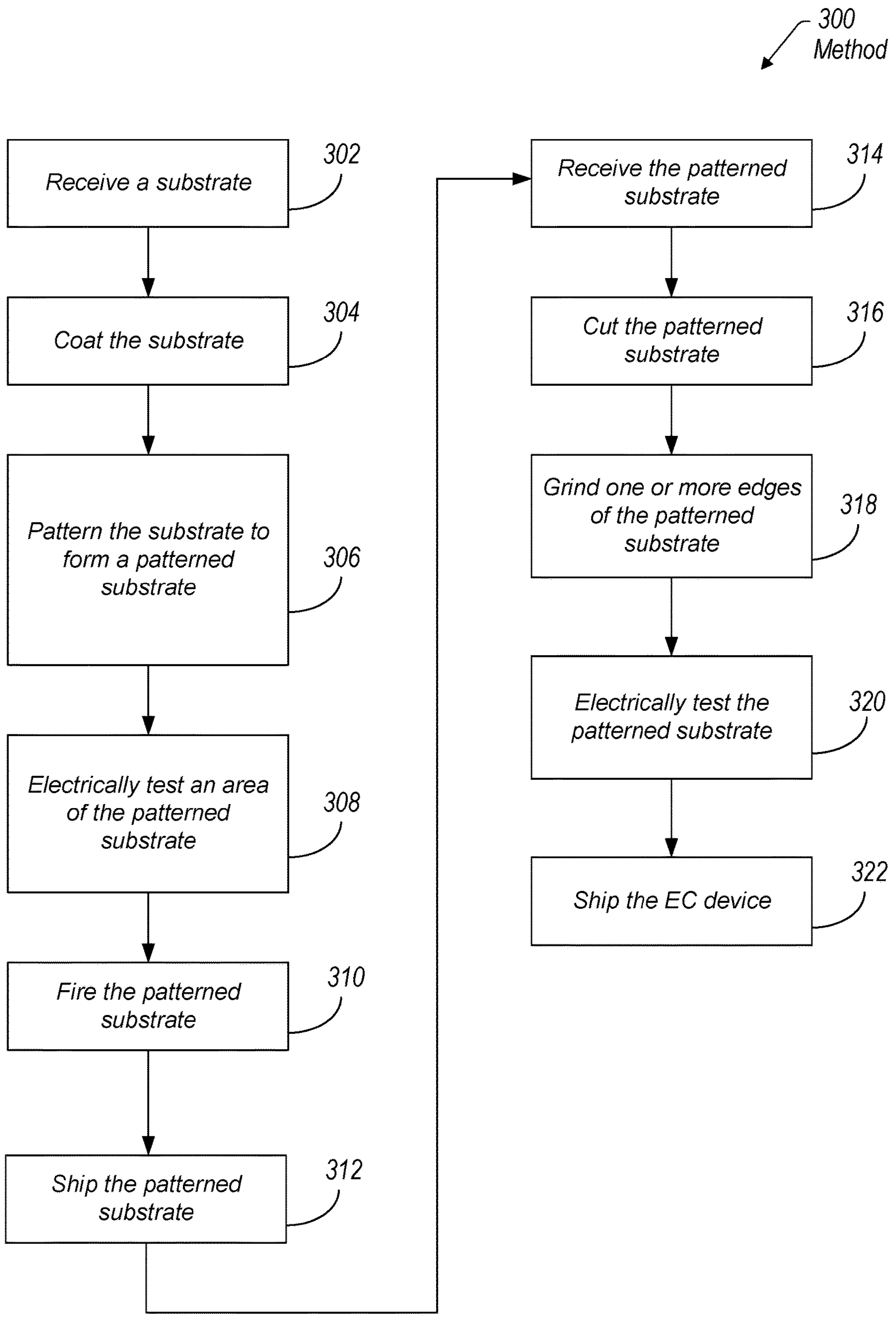
FIG. 3 illustrates a block diagram of an example method according to some aspects of this disclosure.

FIG. 3 illustrates a block diagram of an example method 300 according to some aspects of this disclosure. In some aspects, the method 300 may be implemented using the system 100 illustrated in FIG. 1, the system 100 illustrated in FIGS. 5, 6, 7, 8, 9, 10, 11, 12, 13, 15, 16, 17, 18, 19, 20, 21, and 22. One or more steps and/or one or more aspects described with respect to FIG. 3 may be include with and/or include one or more steps and/or one or more aspects of the method 200 described with respect to FIG. 2, the method 400 described with respect to FIG. 4, and/or the method 1400 described with respect to FIG. 14. FIG. 3, as with the other included figures, is shown for illustrative purposes and does not limit either the possible embodiments of the present invention or the claims. As described herein, unlike the method 200 described with respect to FIG. 2 which may be performed at a single facility, one or more steps of the method 300 described with respect to FIG. 3 may be performed at a first facility and a remainder of the steps of the method 300 may be performed at a second facility that is different from the first facility.

At step 302, a substrate (e.g., a motherboard) may be received, for example, by an assembly line or manufacturing facility. In some aspects, the substrate may be received at a first facility, such as a manufacturing facility. The substrate may be coated with one or more layers (e.g., the second TC layer 126, the EC electrode layer 130, and/or the IC layer 132) or may be received or provided without any layers so that coating may be subsequently performed. At step 304, at the first facility, the substrate may be coated with one or more layers of a plurality of layers. The plurality of layers may constitute an EC stack. For example, the substrate may be coated with one or more layers of a plurality of layer such as the layers described with respect to the EC system 100 illustrated in FIG. 1. For instance, the substrate may be coated with one or more layers including the second transparent conductive (TC) layer 126, the electrochromic (EC) electrode layer 130, the ionic conductive (IC) layer 132, the counter electrode (CE) layer 128, and/or the first TC layer 124 as shown in FIG. 1. In some aspects, the substrate may be coated with a full stack forming the layers of an EC device. For example, the substrate 110 may be coated with the first TC layer 124, the CE layers 128, the IC layer 132, the EC layer 130, and/or the second TC layer 126. In some aspects, the substrate may be coated with a partial stack forming a portion of an EC device. For example, the substrate 110 may be coated with the second TC layer 126 and the EC layer 130.

At step 306, at the first facility, the substrate may be patterned to form a patterned substrate. Patterning may identify one or more areas for forming respective EC devices of the one or more EC devices on the substrate and/or for locating respective busbars for the one or more EC devices. For example, prior to shipping the substrate from one facility to another and/or prior to cutting the substrate into one or more EC devices, the patterning may identify one or more areas for forming respective EC devices of the one or more EC devices on the substrate and/or for locating respective busbars for the one or more EC devices. In some aspects, patterning the substrate may include performing one or more cuts through the one or more layers coated on the substrate. For example, patterning the substrate may including performing one or more cuts to isolate electrical current (e.g., at least partially isolate electrical current, restrict electrical current) through one TC layers (e.g., the first TC layer 124, the second TC layer 126) and/or through one of EC electrode layer 130 or the CE layer 128. As described further herein, these cuts may include a first cut (e.g., first cut 602 illustrated in FIG. 6) and/or a fourth cut (e.g., fourth cut 908 illustrated in FIG. 9). As another example, patterning the substrate may including performing one or more cuts for positions one or more busbars through one or more layers. As described further herein, a third cut (e.g., the third cut 806 illustrated in FIG. 9) may be used to position a busbar (e.g., the first busbar 1010*a* illustrated in FIG. 10) through the one or more layers.

In some aspects, the one or more cuts may include one or more laser cuts through the one or more layers. For example, one or more of a first cut (e.g., the first cut 602 illustrated in FIG. 6), a second cut (e.g., the second cut 704 illustrated in FIG. 7), a third cut (e.g., the third cut 806 illustrated in FIG. 8), a fourth cut (e.g., the fourth cut 908 illustrated in FIG. 9), and/or a fifth cut (e.g., the fifth cut 1212 illustrated in FIG. 12) may be made using one or more laser cuts. In some aspects, different lasers may be used for different cuts. For example, a first cut (e.g., the first cut 602 illustrated in FIG. 6) may be made using about a 10 ps 515 nm (green) laser and a spot size of about 80 μm and may be used for electrically isolating a bottom TC layer (e.g., the second TC layer 126). As another example, a second cut (e.g., the second cut 704 illustrated in FIG. 7) may be made using about a 30 ns 1064 nm (NIR) laser and a spot size of about 100 mm (top hat) and may be used for forming edge delete areas. As another example, a third cut (e.g., the third cut 806 illustrated in FIG. 8) may be made using about a 1.0 ns 515 nm (green) laser and a spot size of about 30 μm and may be used for placing a busbar (e.g., the first busbar 1010*a* illustrated in FIG. 10). As another example, a fourth cut (e.g., the fourth cut 908 illustrated in FIG. 9) may be made using about a 1.0 ns 515 nm (green) laser and a spot size of about 30 μm and may be used for electrically isolating a top TC layer (e.g., the first TC layer 124). As another example, a fifth cut (e.g., the fifth cut 1212 illustrated in FIG. 12) may be made using about a 1.0 ns 515 nm (green) laser and a spot size of about 30 μm and may be used for isolating the plurality of layers.

In some aspects, patterning the substrate may include adding one or more additional layers of the plurality of layers. For example, before patterning, the substrate may be coated with the second transparent conductive (TC) layer 126, the electrochromic (EC) electrode layer 130, the ionic conductive (IC) layer 132. During patterning, the counter electrode (CE) layer 128, and/or the first TC layer 124 may be added or stack on top of the second TC layer 126, the EC electrode layer 130 and the IC layer 132. This may be done to perform one or more cuts through the second TC layer 126, the EC electrode layer 130 and the IC layer 132 for electrical isolation of the second TC layer 126.

It should be noted that in some aspects, that the coating and patterning of the substrate may be performed as separate sequential processes. For example, the substrate may be coated with one or more layers of the plurality of layers and may include at least one cut and may subsequently have one or more additional cuts performed through one or more layers. In some aspects, the coating and the patterning of the substrate may be performed together or may be intertwined with each other. For example, the substrate may be coated with one or more layers, receive one or more patterning aspects as described herein, be coated with a remainder of the plurality of layers, and subsequently receive one or more other patterning aspects as described herein.

In some aspects, after patterning the substrate and/or while patterning the substrate, one or more busbars may be added to one or more of the layers. For instance, prior to shipping the substrate from one facility to another facility and/or prior to cutting the substrate into one or more EC devices, respective busbars for the one or more EC devices may be mounted to the substrate. For example, a first busbar (e.g., the first busbar 1010*a* illustrated in FIG. 10) may be positioned (e.g., via one or more cuts) through one or more layers of the plurality of layers positioned on the substrate. The first busbar may be used to provide electrical current to a bottom TC layer (e.g., the second TC layer 126 as illustrated in FIG. 10). As another example, a second busbar (e.g., the second busbar 1010*b* illustrated in FIG. 11) may be positioned over one or more layers of the plurality of layers positioned on the substrate. The second busbar may be used to provide electrical current to a top TC layer (e.g., the second TC layer 124 as illustrated in FIG. 11). In some aspects, one or more of the busbars may be permanent busbar that are included with the EC device as a final product for shipping. In other aspects, one or more of the busbars may be temporary busbars which may be used, for example, for electrical testing as described herein, and may be subsequently removed from the EC device and replaced with permanent busbars before shipping. Additionally, or alternatively, one or more busbars may be substituted with one or more electrical lines or connections (e.g., wires) positioned through one or more layers for electrical testing as described herein. The electrical lines or connections may be subsequently removed and replaced with busbars as described herein.

At step 308, at the first facility, an area of the patterned substrate may be electrically tested. For instance, the one or more areas for forming respective EC devices of the one or more EC devices may be electrically tested. For example, busbars may be positioned on or in the patterned substrate for each of the one or more areas identified during patterning. The busbars may be then be used to electrically test the respective areas of the substrate. The respective areas of the one or more areas may be individually electrically tested prior to shipping the substrate from one facility to another facility or prior to cutting the substrate into the one or more EC devices. As described herein at least with respect to FIG. 14, electrically testing the one or more areas of the patterned substrate may include power cycling the one or more areas of the patterned substrate, testing the one or more areas of the patterned substrate for shorts, and/or, when necessary, repairing one or more shorts at the one or more areas of the patterned substrate. In some aspects, after power cycling and/or electrically testing, the one or more areas of the patterned substrate may become physically and chemically different compared to before power cycling and/or electrical testing. For example, as a result of power cycling and/or electrical testing, lithium may have moved back and forth between the layers. Some of that lithium may remain trapped in one or more of those layers. As a result, the one or more areas of the patterned substrate may maintain a different color in the clear state compared to the remainder of the patterned substrate. For example, the one or more areas of the patterned substrate may maintain a yellow hue in the clear state and the remainder of the patterned substrate may maintain no color hue. Additionally, or alternatively, the short repair process may create a hole in part of one or more layers as a result of laser repairs. At step 310, at the first facility and after the substrate is coated, patterned, and tested, the substrate may receive a firing process, for example, to cure the plurality of layers stacked on the substrate. At step 312, the substrate may be shipped from the first facility to a second facility. The second facility may be a facility of a customer or may be a facility associated with one or more locations along a supply chain that is separate from the first facility.

At step 314, the substrate may be received by the second facility, and, at step 316, the patterned substrate may be cut, at the second facility, to separate the EC device from a remainder of the substrate. For example, after electrically testing the respective areas of the one or more areas and/or after shipping the substrate from one facility to another facility, the substrate of the EC device may be cut along the one or more identified perimeter edges of at least one area of the one or more areas for forming a respective EC to provide a single EC device or a plurality of distinct EC devices. In some aspects, one or more layers of the patterned substrate may be removed based on the identified perimeters. The one or more layers of the patterned substrate that may be removed may be removed from a remainder of the patterned substrate outside the one or more areas for forming EC device(s). In some aspects, cutting the substrate along the one or more identified perimeter edges may be performed to trim the edges of the EC device so that the substrate is a same size and shape as the one or more layers stack thereon. Additionally, cutting the substrate along the one or more identified perimeter edges may be performed to separate the EC device from one or more other EC devices (e.g., other one or more stack layers) adjacent to the EC device. For example, the substrate may be used for a plurality of EC devices such that the one or more identified perimeter edges may receive one or more cuts to separate the EC device from one or more other EC devices from the same substrate.

At step 318, one or more edges formed from cutting the one or more perimeter edges may be grinded. For example, the one or more edges may be grinded using a "C" shaped grinding wheel and a one pass grinding technique. Additionally, or alternatively, the one or more edges may be grinded using an aerospace "C" shaped grinding wheel and a two-pass grinding technique. The two-passes may include a course grinding pass and a fine grinding pass. Additionally, or alternatively, the one or more edges may be grinded using polished technique including a two-course grinding pass, one fine grinding pass, and a stone grinding pass for a mirror finish. Grinding the one or more perimeter edges may be used to strengthen the EC device. At step 320, the patterned substrate (e.g., the EC device), after being cut, may be electrically tested again. For example, the patterned substrate may be power cycled, tested for shorts, and/or, when necessary, receive one or more repairs for identified shorts. At step 322, the patterned substrate (e.g., the EC device) may be shipped, for example, to a customer and/or to one or more locations along a supply chain.

Please note that the functional block(s) described herein are illustrated in FIG. 3 in merely one example arrangement. In other embodiments, the techniques and functionality described above may be performed using different steps in different orders or may be grouped into a different number of steps or may be performed as a single method without distinct steps.

Figure 4:
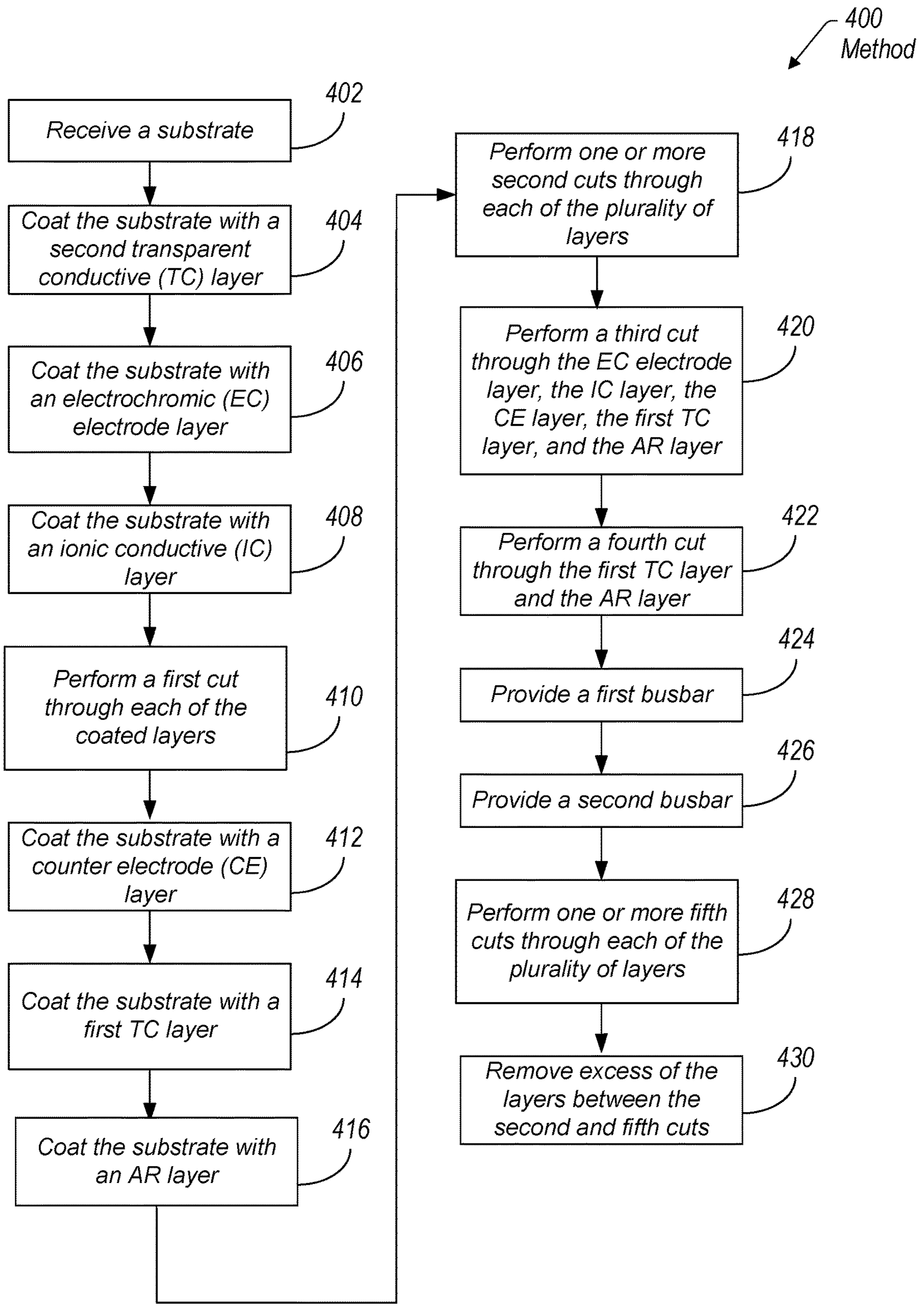
FIG. 4 illustrates a block diagram of an example method according to some aspects of this disclosure.

FIG. 4 illustrates a block diagram of an example method 400 according to some aspects of this disclosure. In some aspects, the method 200 may be implemented using the system 100 illustrated in FIG. 1, the system 100 illustrated in FIGS. 5, 6, 7, 8, 9, 10, 11, 12, 13, 14, 15, 16, 17, 18, 19, 20, 21, and 22. One or more steps and/or one or more aspects described with respect to FIG. 4 may be include with and/or include one or more steps and/or one or more aspects of the method 200 described with respect to FIG. 2, the method 300 described with respect to FIG. 3, and/or the method 1400 described with respect to FIG. 14. FIG. 4, as with the other included figures, is shown for illustrative purposes and does not limit either the possible embodiments of the present invention or the claims. In some aspects, the method 400 may be describes features for performing coating steps (e.g., steps 204 described with respect to FIG. 2, step 304 described with respect to FIG. 3) as described herein and for performing patterning steps (e.g., steps 206 described with respect to FIG. 2, step 306 described with respect to FIG. 3) as described herein. The method 400 described with respect to FIG. 4, may include one or more step illustrated in FIGS. 5, 6, 7, 8, 9, 10, 11, 12, and 13.

Figure 5:
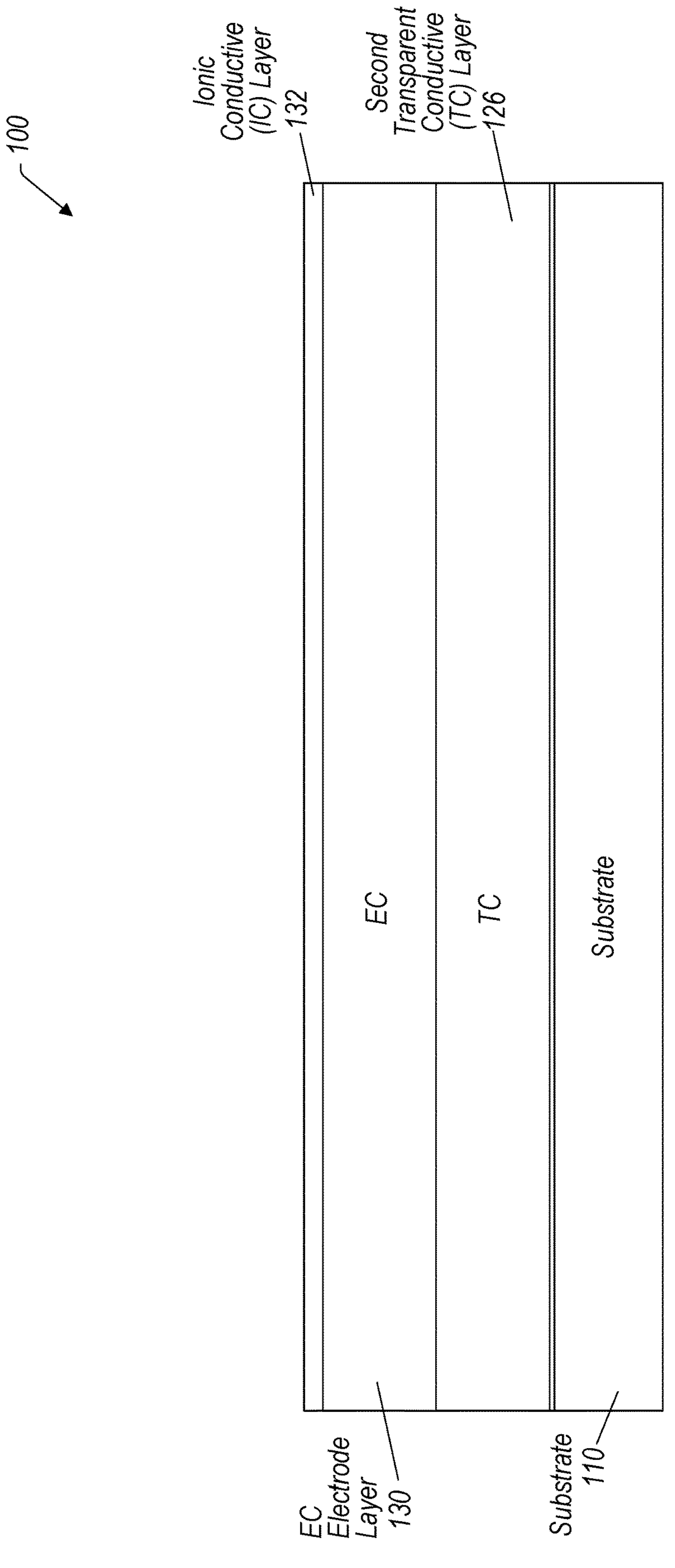
FIG. 5 illustrates a block diagram of an example system according to some aspects of this disclosure.

At step 402, a substrate (e.g., a motherboard) may be received, for example, by an assembly line or manufacturing facility. The substrate may be coated with one or more layers (e.g., the second TC layer 126, the EC electrode layer 130, and/or the IC layer 132) or may be received or provided without any layers so that coating may be subsequently performed. FIG. 5 illustrates a block diagram of the example system 100 according to some aspects of this disclosure. FIG. 5 may include or may be combined with any one or more features and/or one or more aspects described with respect to FIGS. 1, 2, 3, 4, 6, 7, 8, 9, 10, 11, 12, 13, 14, 15, 16 17, 18, 19, 20, 21, and 22. As shown in FIG. 5, the substrate 110 may be provided. In some aspects, the substrate 110 may be coated with the second transparent conductive (TC) layer 126, the electrochromic (EC) electrode layer 130 and/or the ionic conductive layer 132 as described herein. At steps 404, 406, and 408, after reception, the substrate 110 may be coated with one or more layers of a plurality of layers. The plurality of layers may constitute an EC stack. The substrate may be coated with one or more layers of a plurality of layer such as the layers described with respect to the EC system 100 illustrated in FIG. 1. For example, at step 404, the substrate 110 may be coated with the second transparent conductive (TC) layer 126. As another example, at step 406, the substrate 110 may be coated with the electrochromic (EC) electrode layer 130. For example, as shown in FIG. 5, the EC electrode layer 130 may be coated over the second TC layer 126. As yet another example, at step 408, the substrate 110 may be coated with the ionic conductive layer 132. For example, as shown in FIG. 5, the ionic conductive layer 132 may be coated over the EC electrode layer 130. In some aspects, coating the substrate 110 with the second TC layer 126, the EC electrode layer 130, and the IC layer 132 may be performed using one or more hot coating processes.

Figure 6:
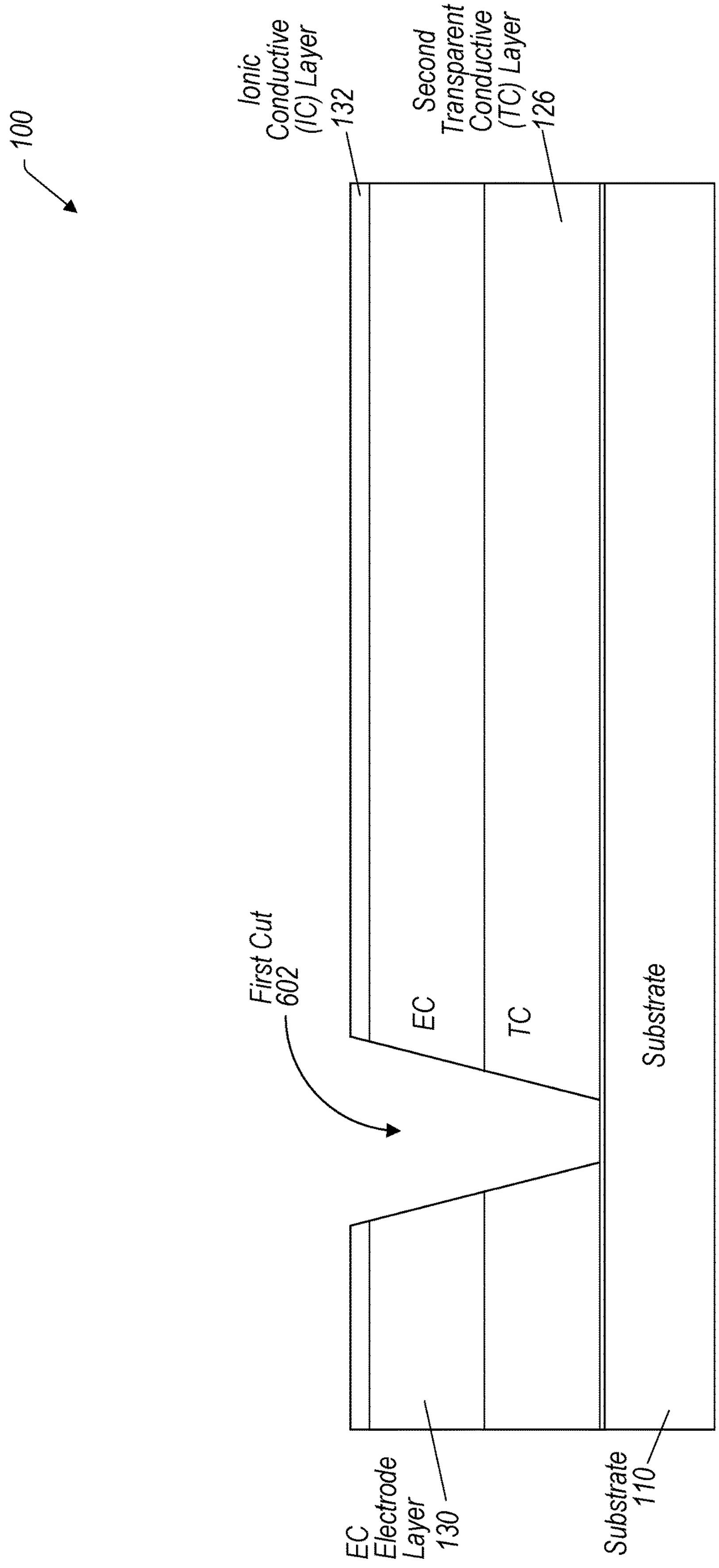
FIG. 6 illustrates a block diagram of an example system according to some aspects of this disclosure.

At step 410, a first cut may be performed through each of the coated layers. FIG. 5 illustrates a block diagram of the example system 100 according to some aspects of this disclosure. FIG. 6 may include or may be combined with any one or more features and/or one or more aspects described with respect to FIGS. 1, 2, 3, 4, 5, 7, 8, 9, 10, 11, 12, 13, 14, 15, 16, 17, 18, 19, 20, 21, and 22. As shown in FIG. 6, the first cut 602 may be performed or made through the second TC layer 126, the EC electrode layer 130, and the ionic conductive layer 132. The first cut 602 may be used to isolate electrical current (e.g., at least partially isolate electrical current, restrict electrical current) through second TC layer 126 and through the EC electrode layer 130.

Figure 7:
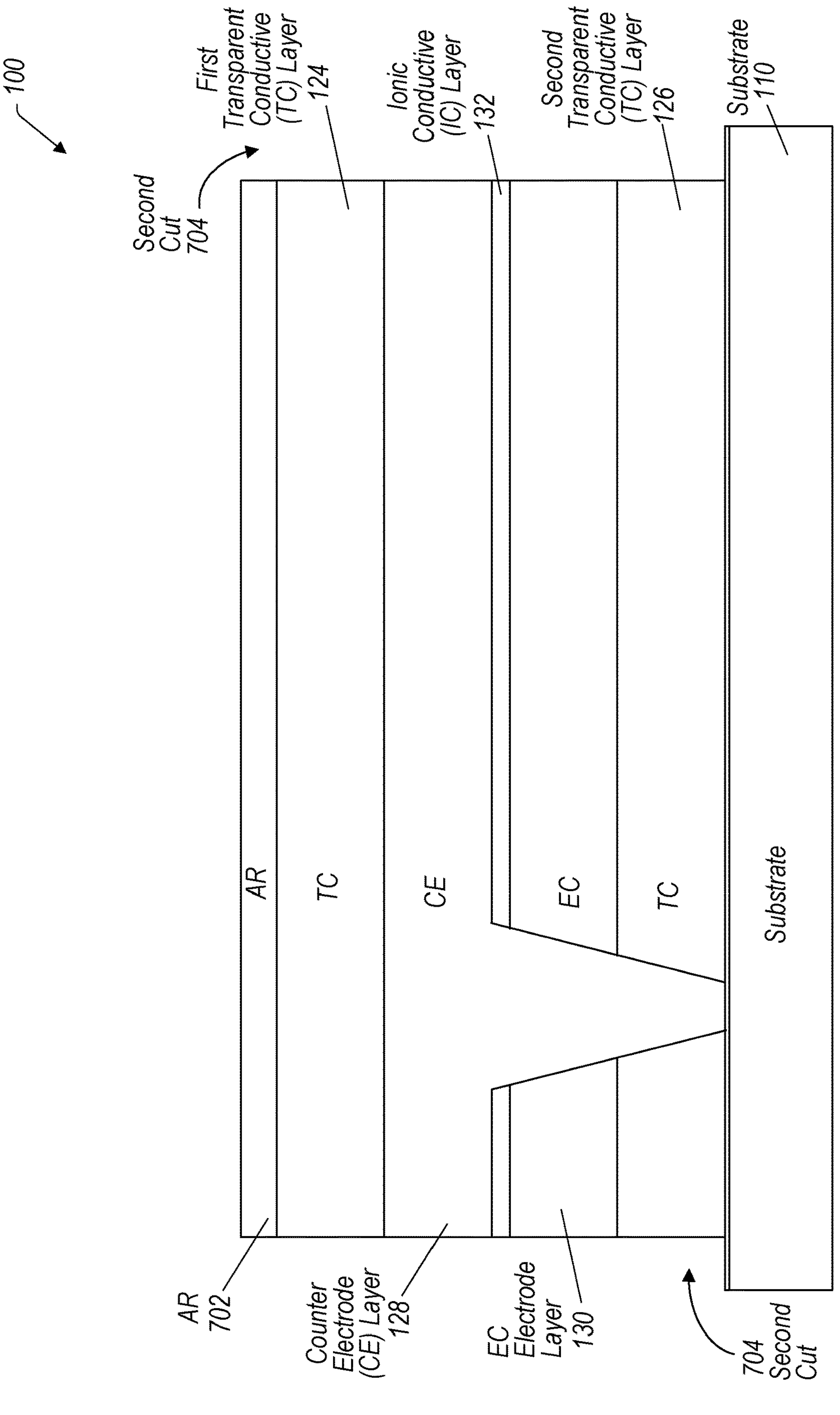
FIG. 7 illustrates a block diagram of an example system according to some aspects of this disclosure.

At step 412, the substrate may coated with a CE layer. FIG. 7 illustrates a block diagram of the example system 100 according to some aspects of this disclosure. FIG. 7 may include or may be combined with any one or more features and/or one or more aspects described with respect to FIGS. 1, 2, 3, 4, 5, 6, 8, 9, 10, 11, 12, 13, 14, 15, 16, 17, 18, 19, 20, 21, and 22. As shown in FIG. 7, the substrate 110 may be coated with the CE layer 128. The CE layer 128 may be coated over the ionic conductive layer 132 and may fill the first cut 602 to isolate electric current (e.g., at least partially isolate electrical current, restrict electrical current) through second TC layer 126 and through the EC electrode layer 130. At step 414, the substrate may be coated with the first TC layer 124. As shown in FIG. 7, the first TC layer may be coated over the CE layer 128. At step 416, the AR layer 702 may be coated over the first TC layer 124. The AR layer 702 may include silicon and protect the remaining layers of the EC device. In some aspects, coating the substrate 110 with the CE layer 128, the first TC layer 126, and the AR layer 702 may be performed using one or more cold coating processes. At step 418, the one or more second cuts may be performed through each of the plurality of layers. As shown in FIG. 7, one or more second cuts 704 may be performed on one or more perimeter edges of the EC device identifying the perimeter edges of the EC device. The one or more second cuts 704 may be performed through the one or more layers coated on the substrate to form one or more edge delete areas. In some aspects, the one or more edge delete areas may also be for isolating the plurality of layers. The edge delete areas may provide a basis for position one or more busbars and for cutting out EC devices as described herein.

Figure 8:
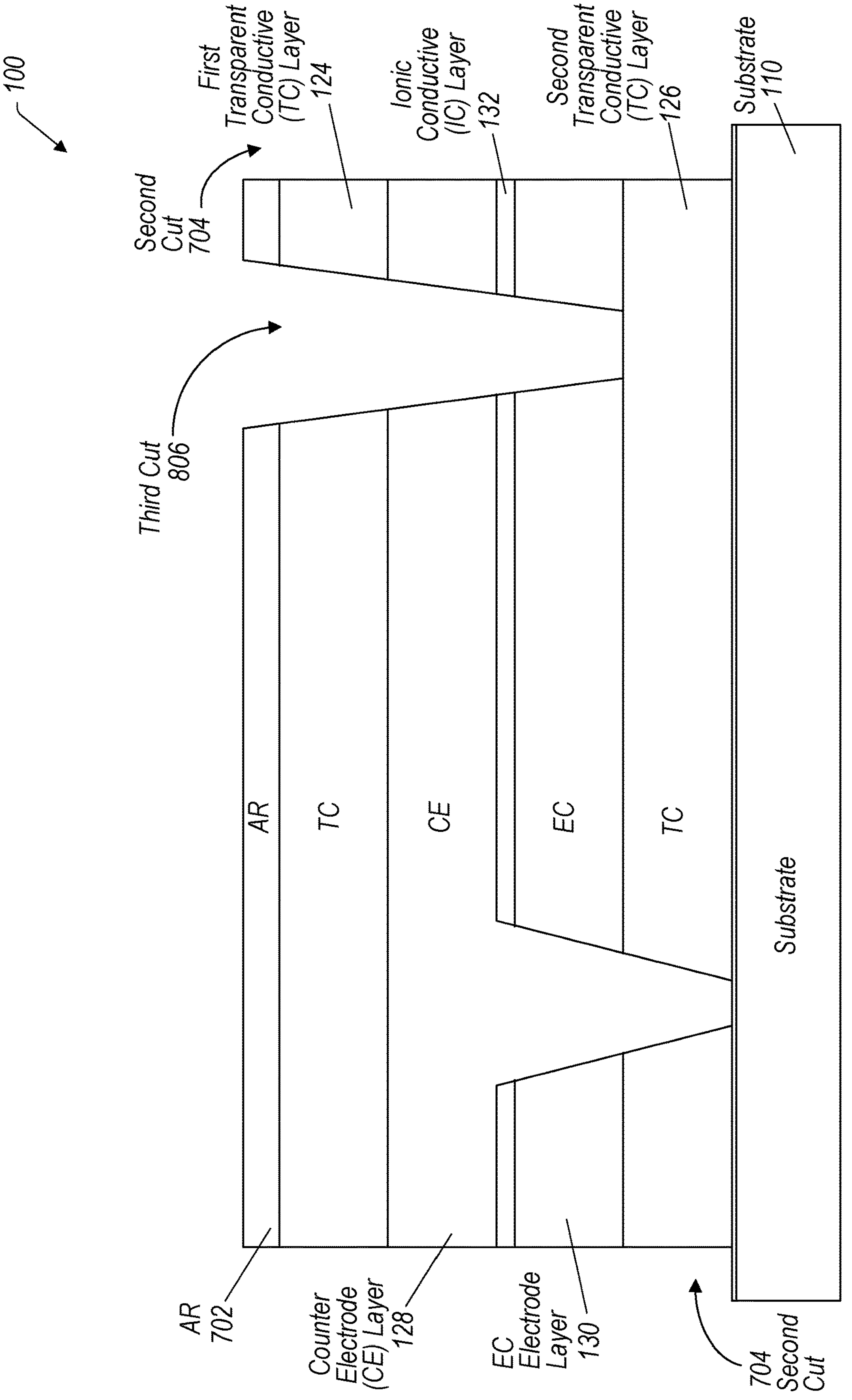
FIG. 8 illustrates a block diagram of an example system according to some aspects of this disclosure.

At step 420, one or more third cuts may be performed through the EC electrode layer, the IC layer, the CE layer, the first TC layer, and the AR layer. FIG. 8 illustrates a block diagram of the example system 100 according to some aspects of this disclosure. FIG. 8 may include or may be combined with any one or more features and/or one or more aspects described with respect to FIGS. 1, 2, 3, 4, 5, 6, 7, 9, 10, 11, 12, 13, 14, 15, 16, 17, 18, 19, 20, 21, and 22. As shown in FIG. 8, a third cut 806 may be performed through the EC electrode layer 130, the IC layer 132, the CE layer 128, the first TC layer 124, and the AR layer 702. As described herein the third cut 806 may be used to receive a busbar for providing an electrical current to the second TC layer 126.

Figure 9:
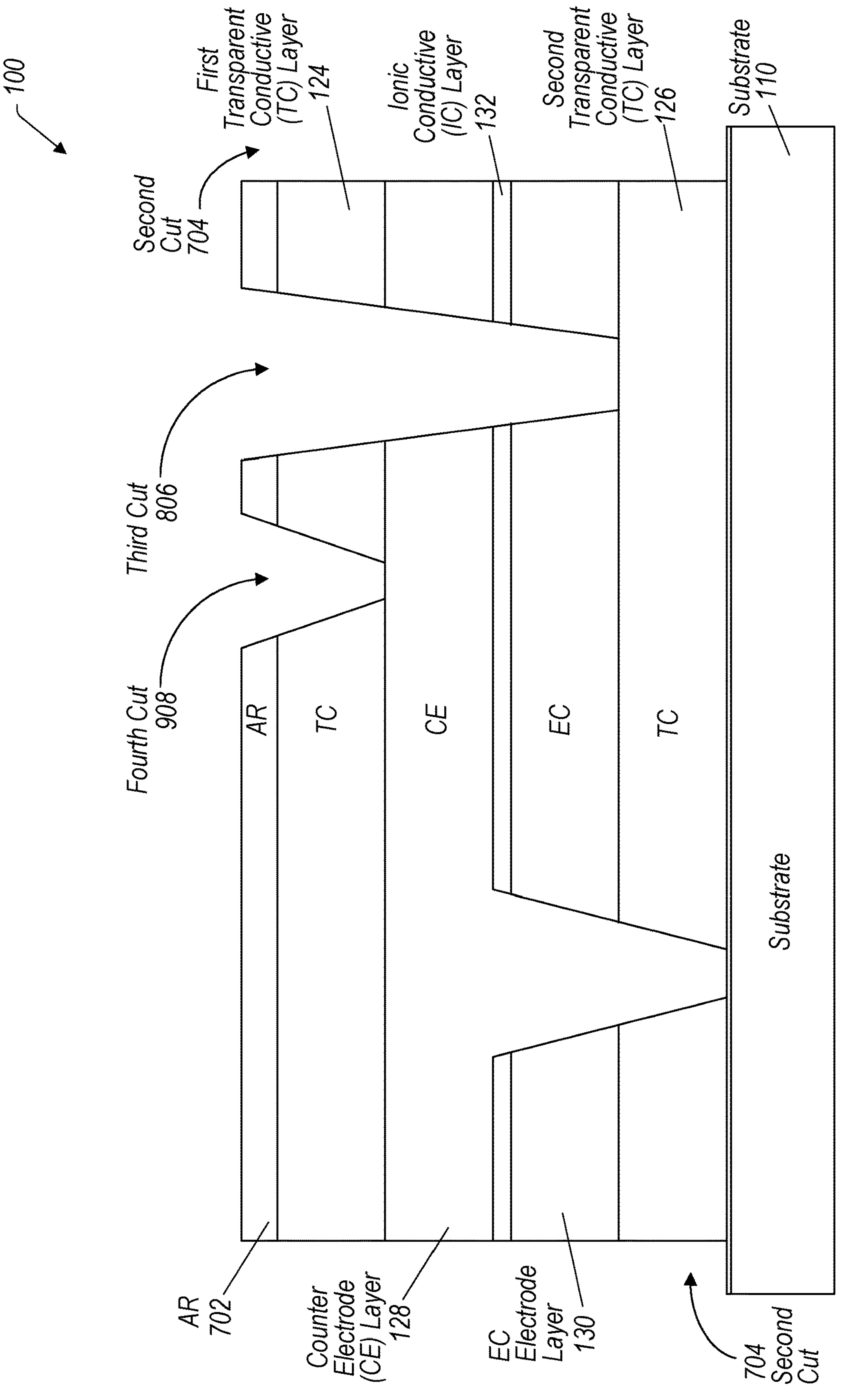
FIG. 9 illustrates a block diagram of an example system according to some aspects of this disclosure.

At step 422, one or more fourth cuts may be performed through the first TC layer, and the AR layer. FIG. 9 illustrates a block diagram of the example system 100 according to some aspects of this disclosure. FIG. 9 may include or may be combined with any one or more features and/or one or more aspects described with respect to FIGS. 1, 2, 3, 4, 5, 6, 7, 8, 10, 11, 12, 13, 14, 15, 16, 17, 18, 19, 20, 21, and 22. As shown in FIG. 9, a fourth cut 908 may be performed through the first TC layer 124 and the AR layer 702. As described herein the fourth cut 908 may be used to isolate electrical current (e.g., at least partially isolate electrical current, restrict electrical current) through the first TC layer 124, the AR layer 702, and through the CE layer 128.

At step 424, a first busbar may be provided. FIG. 10 illustrates a block diagram of the example system 100 according to some aspects of this disclosure. FIG. 10 may include or may be combined with any one or more features and/or one or more aspects described with respect to FIGS. 1, 2, 3, 4, 5, 6, 7, 8, 9, 11, 12, 13, 14, 15, 16, 17, 18, 19, 20, 21, and 22. As shown in FIG. 10, a first busbar **1010*a* may be positioned in the third cut 806 to provide electrical current to the second TC layer 126. At step 426, a second busbar may be provided. FIG. 11 illustrates a block diagram of the example system 100 according to some aspects of this disclosure. FIG. 11 may include or may be combined with any one or more features and/or one or more aspects described with respect to FIGS. 1, 2, 3, 4, 5, 6, 7, 8, 9, 10, 12, 13, 14, 15, 16, 17, 18, 19, 20, 21, and 22. As shown in FIG. 11, a second busbar 1010*b* may be positioned in the AR layer 702 to provide electrical current to the first TC layer 124. In some aspects, one or more laser cuts may be made through the AR layer 702 for positioning the second busbar 1010*b* with the EC device 105**. In some aspects, one or more of the busbars may be permanent busbar that are included with the EC device as a final product for shipping. In other aspects, one or more of the busbars may be temporary busbars which may be used, for example, for electrical testing as described herein, and may be subsequently removed from the EC device and replaced with permanent busbars before shipping.

Figure 12:
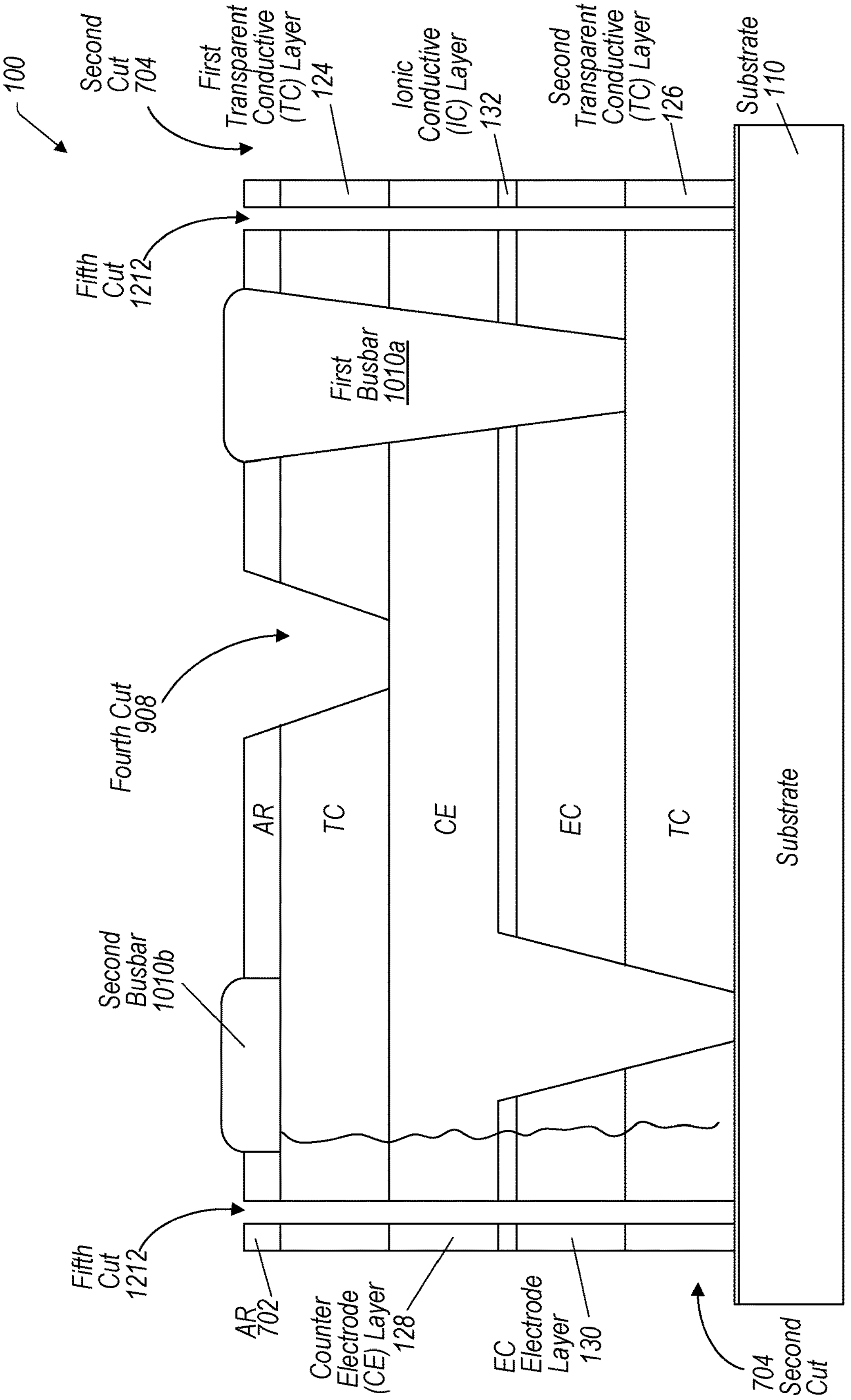
FIG. 12 illustrates a block diagram of an example system according to some aspects of this disclosure.
Figure 13:
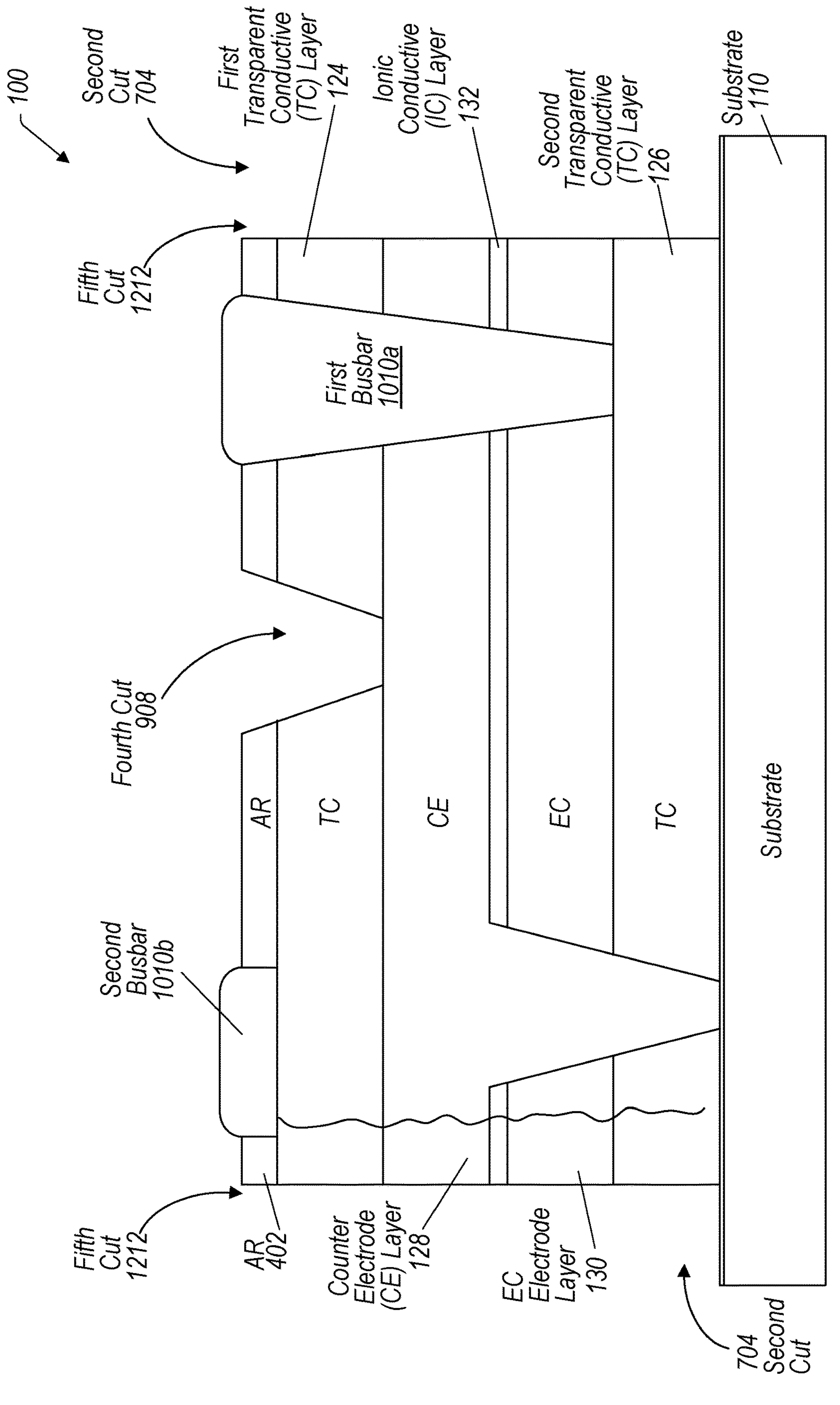
FIG. 13 illustrates a block diagram of an example system according to some aspects of this disclosure.

At step 428, one or more fifth cuts may be performed through each of the plurality of layers. FIG. 12 illustrates a block diagram of the example system 100 according to some aspects of this disclosure. FIG. 12 may include or may be combined with any one or more features and/or one or more aspects described with respect to FIGS. 1, 2, 3, 4, 5, 6, 7, 8, 9, 10, 11, 13, 14, 15, 16, 17, 18, 19, 20, 21, and 22. As shown in FIG. 12, one or more fifth cuts 1212 may be performed through each of the plurality of layers including the AR layer 702, the first TC layer 124, the CE layer 128, the IC layer 132, the EC electrode layer 130, and the second TC layer 126. At step 430, excess of the plurality of layers may be removed between the second cuts 704 and the fifth cuts 1212. FIG. 13 illustrates a block diagram of the example system 100 according to some aspects of this disclosure. FIG. 13 may include or may be combined with any one or more features and/or one or more aspects described with respect to FIGS. 1, 2, 3, 4, 5, 6, 7, 8, 9, 10, 11, 12, 14, 15, 16, 17, 18, 19, 20, 21, and 22. As shown in FIG. 13, excess of the plurality of layers is removed between the second cuts 704 and the fifth cuts 1212.

In some aspects, the one or more cuts may include one or more laser cuts through the one or more layers. For example, one or more of a first cut (e.g., the first cut 602 illustrated in FIG. 6), a second cut (e.g., the second cut 704 illustrated in FIG. 7), a third cut (e.g., the third cut 806 illustrated in FIG. 8), a fourth cut (e.g., the fourth cut 908 illustrated in FIG. 9), and/or a fifth cut (e.g., the fifth cut 1212 illustrated in FIG. 12) may be made using one or more laser cuts. In some aspects, different lasers may be used for different cuts. For example, a first cut (e.g., the first cut 602 illustrated in FIG. 6) may be made using about a 10 ps 515 nm (green) laser and a spot size of about 80 μm and may be used for electrically isolating a bottom TC layer (e.g., the second TC layer 126). As another example, a second cut (e.g., the second cut 704 illustrated in FIG. 7) may be made using about a 30 ns 1064 nm (NIR) laser and a spot size of about 100 mm (top hat) and may be used for forming edge delete areas. As another example, a third cut (e.g., the third cut 806 illustrated in FIG. 8) may be made using about a 1.0 ns 515 nm (green) laser and a spot size of about 30 μm and may be used for placing a busbar (e.g., the first busbar 1010*a* illustrated in FIG. 10). As another example, a fourth cut (e.g., the fourth cut 908 illustrated in FIG. 9) may be made using about a 1.0 ns 515 nm (green) laser and a spot size of about 30 μm and may be used for electrically isolating a top TC layer (e.g., the first TC layer 124). As another example, a fifth cut (e.g., the fifth cut 1212 illustrated in FIG. 12) may be made using about a 1.0 ns 515 nm (green) laser and a spot size of about 30 μm and may be used for isolating the plurality of layers.

It should be noted that in some aspects, that the coating and patterning of the substrate may be performed as separate sequential processes. For example, the substrate may be coated with the plurality of layers including the first cut and subsequently patterned. In other aspects, the coating and the patterning of the substrate may be performed together or may be intertwined with each other. For example, the substrate may be coated with one or more layers, receive one or more patterning aspects as described herein, be coated with a remainder of the plurality of layers, and subsequently receive one or more other patterning aspects as described herein.

Please note that the functional block(s) described herein are illustrated in FIG. 4 in merely one example arrangement. In other embodiments, the techniques and functionality described above may be performed using different steps in different orders or may be grouped into a different number of steps or may be performed as a single method without distinct steps.

Figure 14:
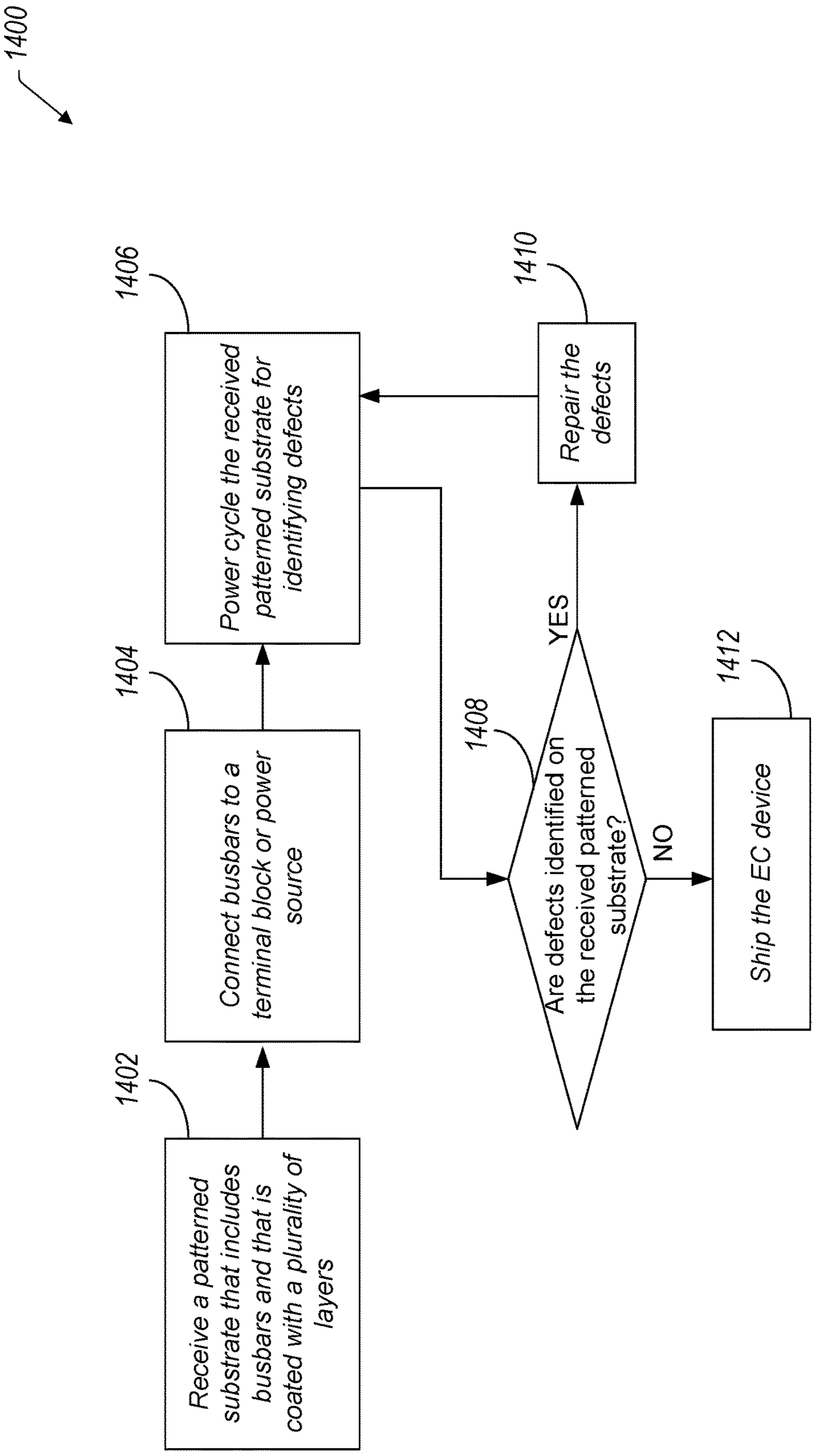
FIG. 14 illustrates a block diagram of an example method according to some aspects of this disclosure.

As described herein at least with respect to steps 208 and 214 of FIG. 2 and steps 308 and 320 of FIG. 3, a patterned substrate may be electrically tested. For example, an area of a patterned substrate may be electrically tested. Electrically testing the one or more areas of the patterned substrate includes at least one of power cycling the one or more areas of the patterned substrate, testing the one or more areas of the patterned substrate for shorts, or repairing one or more shorts at the one or more areas of the patterned substrate. FIG. 14 illustrates a block diagram of an example method 1400 according to some aspects of this disclosure. In some aspects, the method 1400 may be implemented using the system 100 illustrated in FIG. 1, the system 100 illustrated in FIGS. 5, 6, 7, 8, 9, 10, 11, 12, 13, 15, 16, 17, 18, 19, 20, 21, and 22. One or more steps and/or one or more aspects described with respect to FIG. 14 may be include with and/or include one or more steps and/or one or more aspects of the method 200 described with respect to FIG. 2, the method 300 described with respect to FIG. 3, and/or the method 400 described with respect to FIG. 4. FIG. 14, as with the other included figures, is shown for illustrative purposes and does not limit either the possible embodiments of the present invention or the claims. At step 1402, a patterned substrate may be received. The patterned substrate may include busbars and may be coated with a plurality of layer forming an EC stack. For example, the patterned substrate may be removed from a manufacturing line and elevated to an upper testing level of a manufacturing facility. At step 1404, the busbars may be connected to a terminal block or power source for power cycling. At step 1406, the patterned substrate may be power cycled for identifying defects. For example, power cycling to exchange lithium between the EC electrode layer and the CE layer multiple times may stabilize EC device performance and heal hard and soft shorts making eventual defects appear before the EC device is sent to the customer. Further, applying moderately higher voltages compared to field conditions during power cycling may burn some shorts. In some aspects, power cycling the EC device may ensure that the EC will perform as intended. For example, power cycling the EC may identify an optical performance of the EC device and different tint levels and both locally and across an entire EC device surface. As another example, power cycling an EC device may testing tint uniformity, tinting changing speeds and patterns. As another example, power cycling the EC device may be used to determine defect size and density (e.g., for shorts, blue dots, and scratches), determine the existence of electrical leakage at various steady states, and determine an amount of lithium charge density exchanged. At step 1408, a determination may be made whether any defects are identified on the patterned substrate as a result of power cycling. These defects may be identified using visible spectrum cameras and/or IR cameras. If defects are identified, then at step 1410, the identified defects of the patterned substrate may be repaired. After the identified defects of the patterned substrate are repaired, then at step 1406, the patterned substrate may be power cycled again for identifying defects. If no defects are identified, then at step 1412, the patterned substrate may be prepared for shipping. It should be understood that defects may include short and/or hot spots. Shorts include hard shorts which are shirt circuits leading to a visible halo in a steady state, soft shorts which are short circuits leading to an intermittent visible halo during switching that usually disappears in the steady state. It should also be understood that hot spots are short circuits leading to a punctual increase in temperature of the EC stack.

Figure 15:
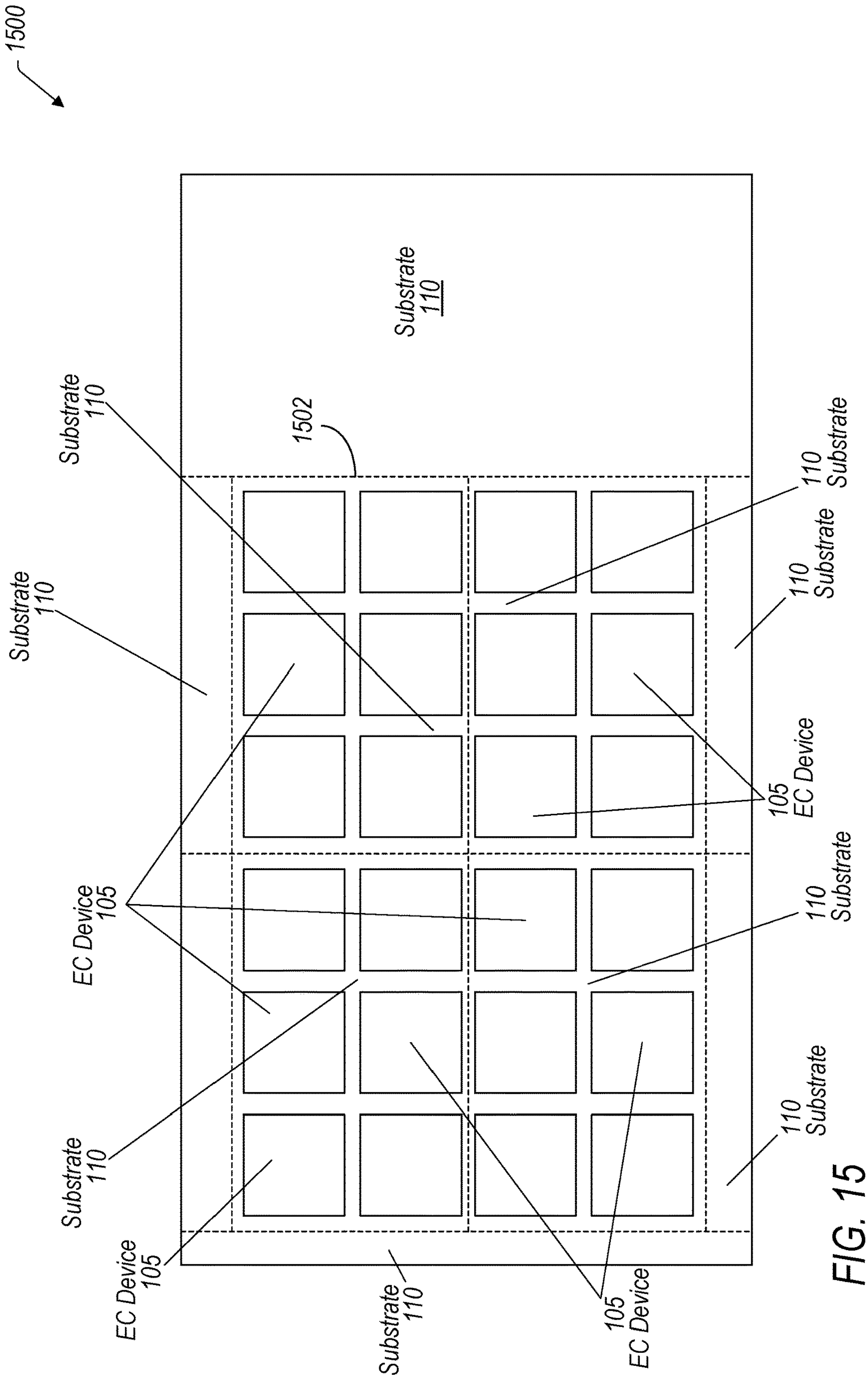
FIG. 15 illustrates a block diagram of an example set of EC systems system according to some aspects of this disclosure.

As described herein at least with respect to step 210 as described with respect to FIG. 2 and step 316 as described with respect to FIG. 3, the patterned substrate may be cut to separate the EC device from a remainder of the substrate. FIG. 15 illustrates a block diagram of an example set of EC systems 1500 according to some aspects of this disclosure. The set of EC systems 1500 may include one or more same or similar features as the features described with respect to or illustrated in FIGS. 2, 3, 4, 5, 6, 7, 8, 9, 10, 11, 12, 13, 14, 16, 17, 18, 19, 20, 21, and 22. For example, the set EC systems 1500 may include and/or be manufactured using one or more same or similar features as the features described with respect to the method 200 described with respect to FIG. 2, the method 300 described with respect to FIG. 3, the method 400 described with respect to FIG. 4 and/or the method 1400 described with respect to FIG. 14. FIG. 15, as with the other included figures, is shown for illustrative purposes and does not limit either the possible embodiments of the present invention or the claims. As shown in FIG. 15, the substrate 110 may include a plurality of EC devices 105 positioned on the substrate 110. Each EC device 105 position on the substrate 110 may constitute an EC system of the set of EC systems 1500. Each of the EC devices 105 may be separated from each other due to the second cuts 704 and the fifth cuts 1212 as illustrated at least with respect to FIG. 12. The substrate 110 may also include one or more areas that do not include an EC device. As described herein, the substrate 110 may be cut along the dotted lines 1502 of the EC device (e.g., one or more identified perimeter edges) to separate the EC systems into subgroups, for example, for further processing and/or shipping as described herein. Cutting the substrate may be made using a $CO_2$ (10.6 μm) continuous laser with a spot shape that is elliptical and a spot size that is several millimeters wide. In some aspects, the cutting the substrate may use a thermal laser separation process that includes generating a mechanical crack on an edge of the substrate (e.g., glass) for subsequently propagating the crack, heating the substrate with a $CO_2$ (10.6 μm) continuous laser with a spot shape that is elliptical and a spot size that is several millimeters wide and cooling the heated area with water spray to propagate the mechanically created crack in the substrate, and mechanically breaking the substrate along the laser and water treated area manually (e.g., with a breaker).

Figure 16:
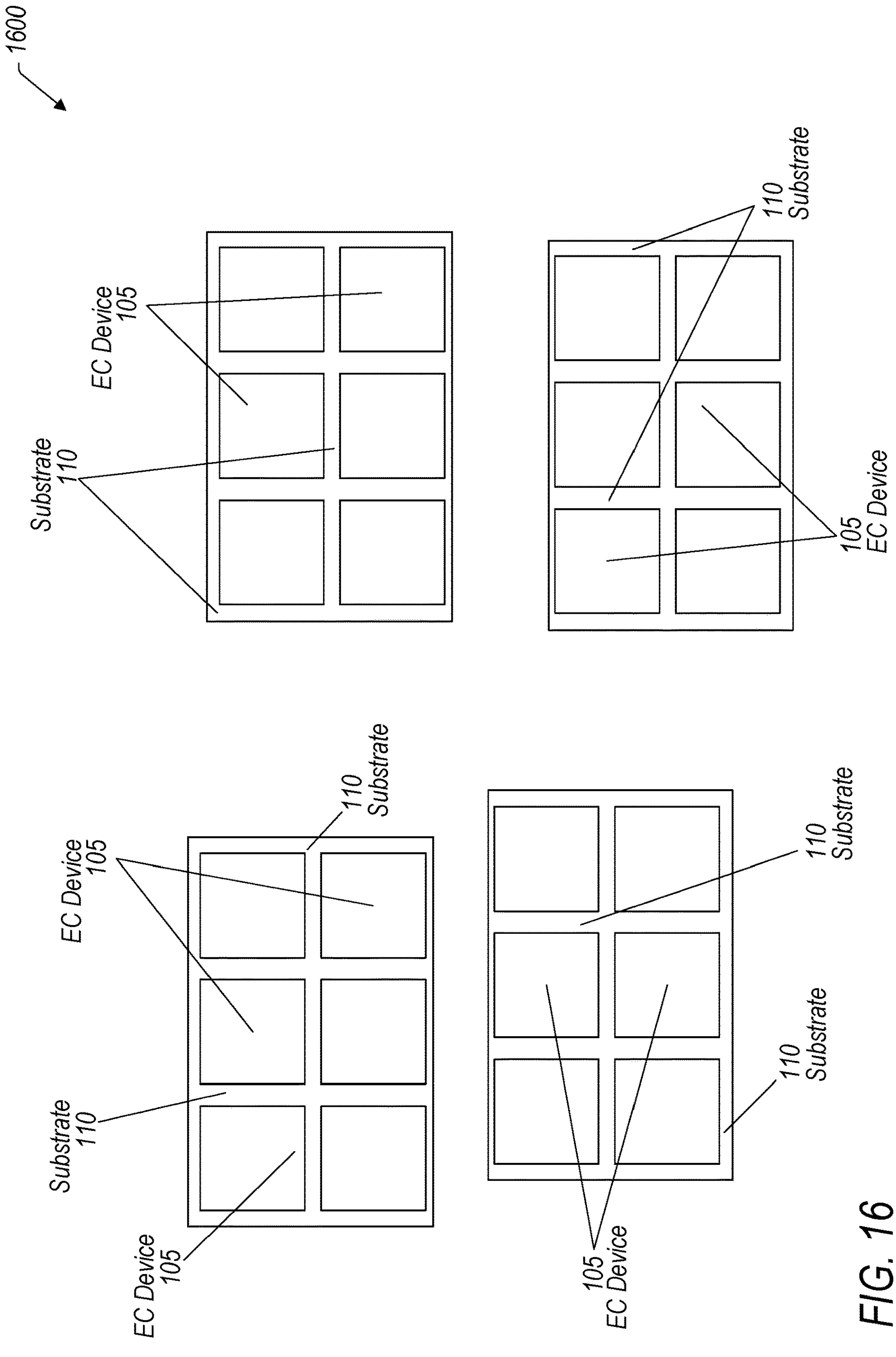
FIG. 16 illustrates a block diagram of an example set of EC systems according to some aspects of this disclosure.

FIG. 16 illustrates a block diagram of an example set of EC systems 1600 according to some aspects of this disclosure. The set of EC systems 1600 may include one or more same or similar features as the features described with respect to or illustrated in FIGS. 2, 3, 4, 5, 6, 7, 8, 9, 10, 11, 12, 13, 14, 15, 17, 18, 19, 20, 21, and 22. For example, the set EC systems 1600 may include and/or be manufactured using one or more same or similar features as the features described with respect to the method 200 described with respect to FIG. 2, the method 300 described with respect to FIG. 3, the method 400 described with respect to FIG. 4 and/or the method 1400 described with respect to FIG. 14. FIG. 16, as with the other included figures, is shown for illustrative purposes and does not limit either the possible embodiments of the present invention or the claims. As shown in FIG. 16, the substrate 110 may have been cut along the one or more dotted lines 1502 (e.g., one or more identified perimeter edges) to form one or more subgroups of EC systems, for example, for further processing and/or shipping as described herein.

Figure 17:
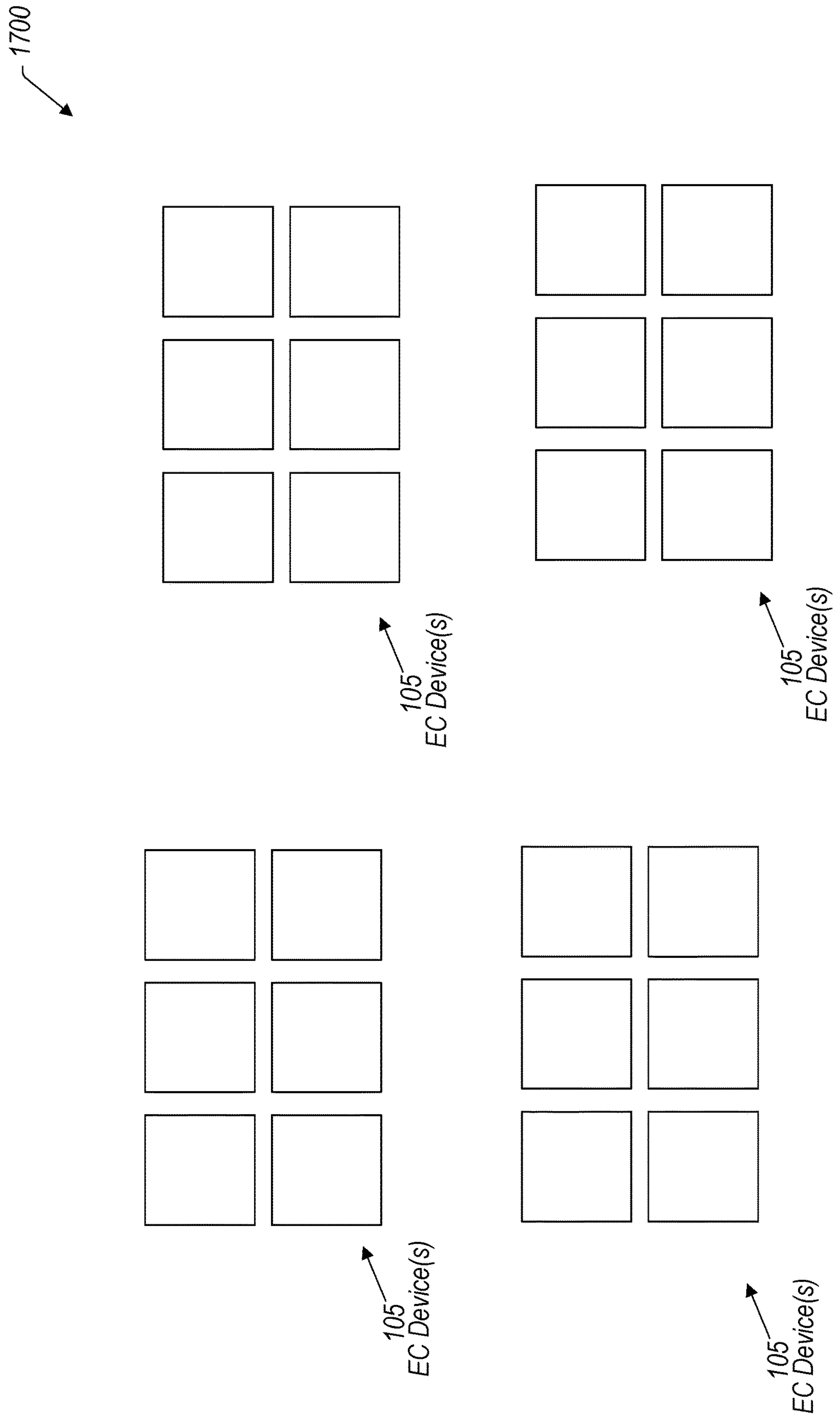
FIG. 17 illustrates a block diagram of an example set of EC systems according to some aspects of this disclosure.

FIG. 17 illustrates a block diagram of an example set of EC systems 1700 according to some aspects of this disclosure. The set of EC systems 1700 may include one or more same or similar features as the features described with respect to or illustrated in FIGS. 2, 3, 4, 5, 6, 7, 8, 9, 10, 11, 12, 13, 14, 15, 16, 18, 19, 20, 21, and 22. For example, the set EC systems 1700 may include and/or be manufactured using one or more same or similar features as the features described with respect to the method 200 described with respect to FIG. 2, the method 300 described with respect to FIG. 3, the method 400 described with respect to FIG. 4 and/or the method 1400 described with respect to FIG. 14. FIG. 17, as with the other included figures, is shown for illustrative purposes and does not limit either the possible embodiments of the present invention or the claims. As shown in FIG. 17, the substrate 110 may have been trimmed or cut along the edges of the respective EC devices so that the substrate is a same size and shape as the one or more layers stack thereon. Additionally, trimming or cutting the substrate along the edges of the respective EC devices may be performed to separate the respective EC devices from one another, for example, for further processing and/or shipping as described herein.

In some aspects, after the substrates are cut or trimmed along the edges of the respective EC devices, one or more edges formed from the trimming or cutting may be grinded. For example, the one or more edges may be grinded using a "C" shaped grinding wheel and a one pass grinding technique. Additionally, or alternatively, the one or more edges may be grinded using an aerospace "C" shaped grinding wheel and a two-pass grinding technique. The two-passes may include a course grinding pass and a fine grinding pass. Additionally, or alternatively, the one or more edges may be grinded using polished technique including a two-course grinding pass, one fine grinding pass, and a stone grinding pass for a mirror finish. Grinding the one or more perimeter edges may be used to strengthen the EC device.

Figure 18:
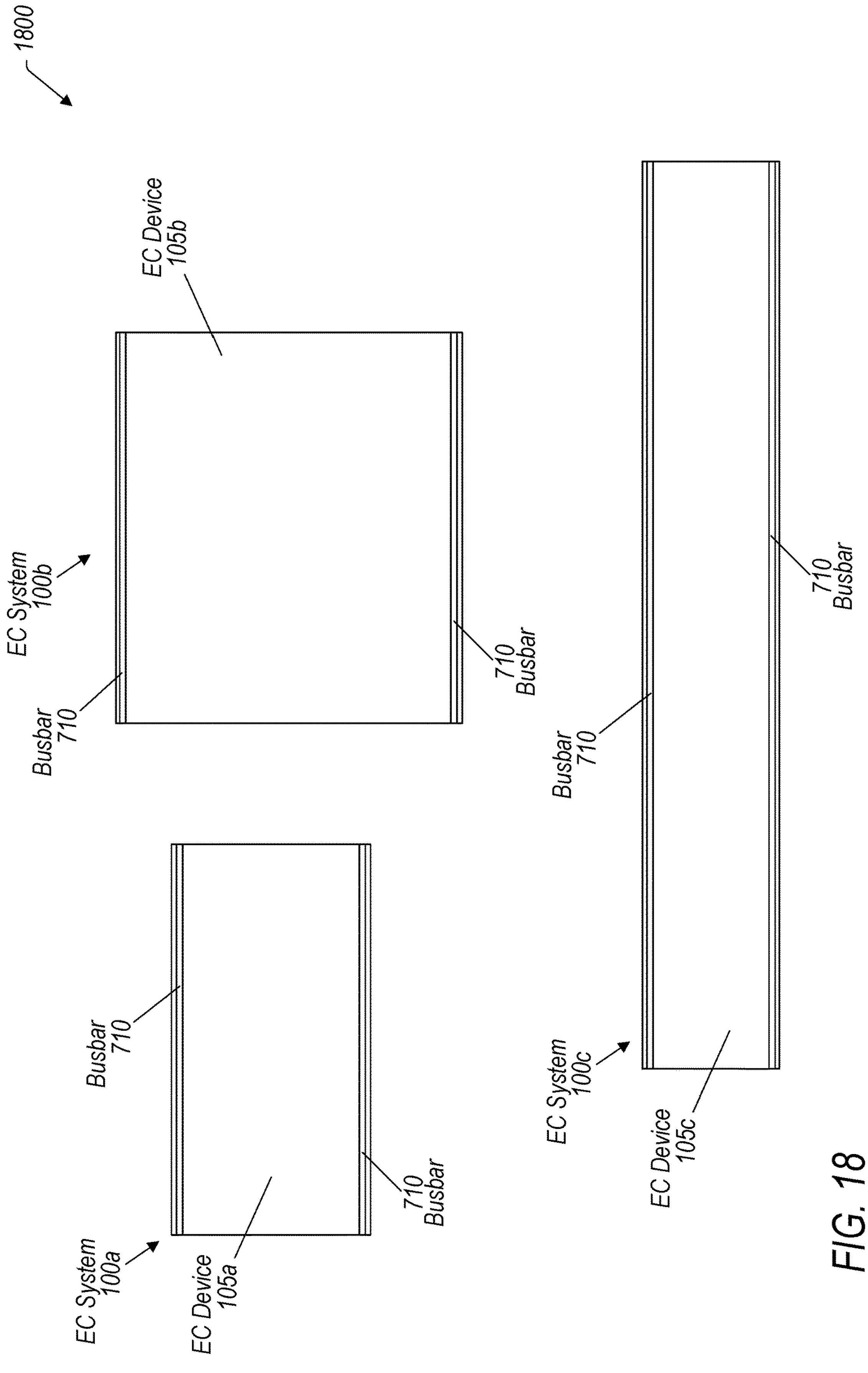
FIG. 18 illustrates a block diagram of an example set of EC systems according to some aspects of this disclosure.

FIG. 18 illustrates a block diagram of an example set of EC systems 1800 according to some aspects of this disclosure. The set of EC systems 1800 may include one or more same or similar features as the features described with respect to or illustrated in FIGS. 2, 3, 4, 5, 6, 7, 8, 9, 10, 11, 12, 13, 14, 15, 16, 17, 19, 20, 21, and 22. For example, the set EC systems 1800 may include and/or be manufactured using one or more same or similar features as the features described with respect to the method 200 described with respect to FIG. 2, the method 300 described with respect to FIG. 3, the method 400 described with respect to FIG. 4 and/or the method 1400 described with respect to FIG. 14. FIG. 18, as with the other included figures, is shown for illustrative purposes and does not limit either the possible embodiments of the present invention or the claims. As shown in FIG. 18, a variety of different EC systems may be produced from one substrate 110 allowing for every panel or substrate to full custom. For example, different EC systems may include a first EC system 100*a*, and second EC system 100*b*, and a third EC system 110*c*. Each of the first EC system 100*a*, the EC system 100*b*, and the third EC system 100*c* may include busbars 710 and an EC devices 105*a*, 105*b*, and 105*c*, respectively. The first EC system 100*a* may be shorter than the third EC system 100*c* and narrower than the second EC system 100*b*. The second EC system 100*b* may be wider than both the first EC system 100*a* and the third EC system 100*c* while being longer than the first EC system 100*a* and shorter than the third EC system 100*c*. A plurality of different EC systems with the different lengths and widths may be formed on a single substrate 110 to best utilize the available area of the substrate 110.

Figure 19:
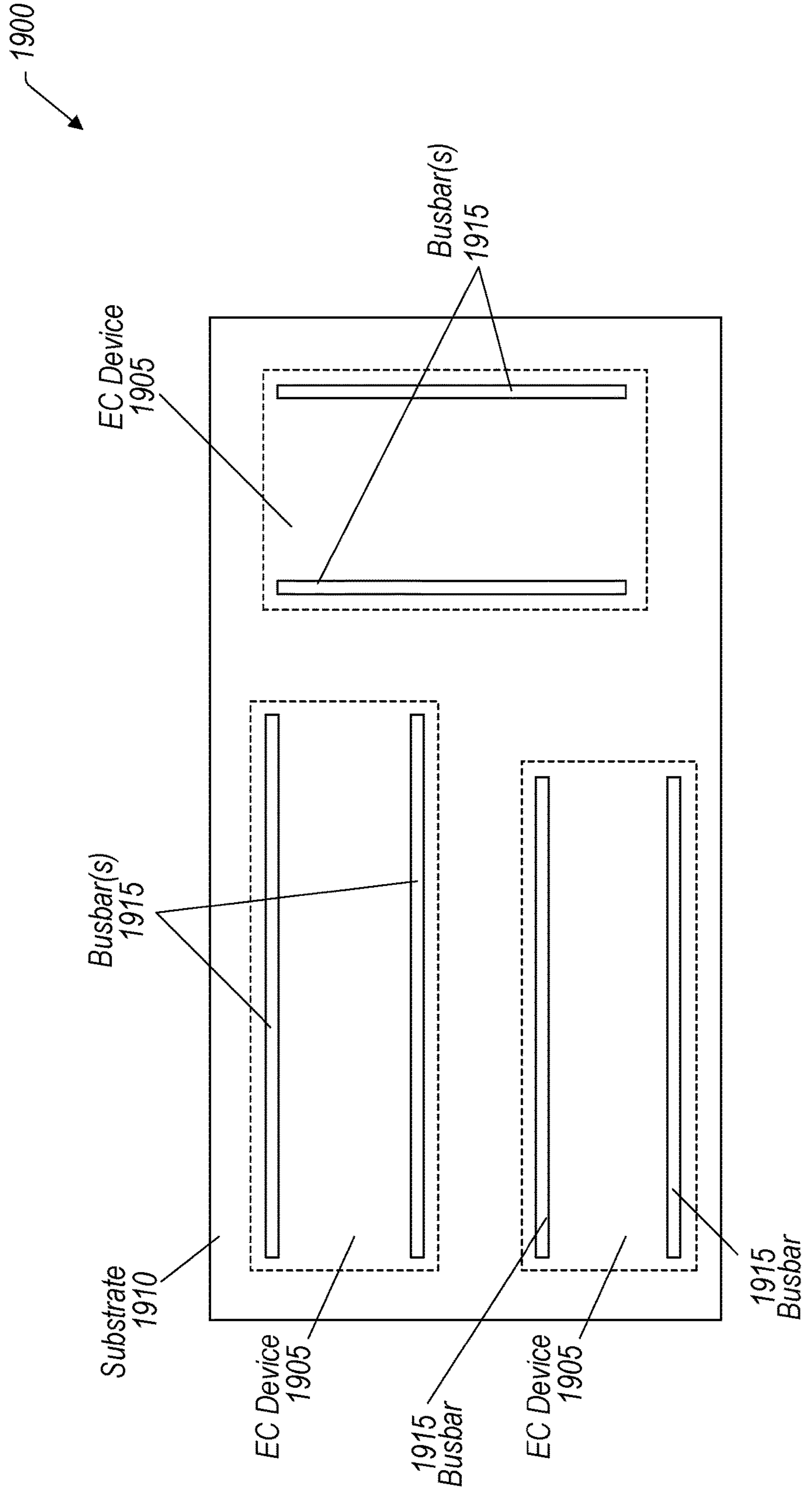
FIG. 19 illustrates a perspective view of an example set of EC systems according to some aspects of this disclosure.

FIG. 19 illustrates a perspective view of an example set of EC systems 1900 according to some aspects of this disclosure. The set of EC systems 1900 may include one or more same or similar features as the features described with respect to or illustrated in FIGS. 2, 3, 4, 5, 6, 7, 8, 9, 10, 11, 12, 13, 14, 15, 16, 17, 18, 20, 21, and 22. For example, the set of EC systems 1900 may include and/or be manufactured using one or more same or similar features as the features described with respect to the method 200 described with respect to FIG. 2, the method 300 described with respect to FIG. 3, the method 400 described with respect to FIG. 4 and/or the method 1400 described with respect to FIG. 14. FIG. 19, as with the other included figures, is shown for illustrative purposes and does not limit cither the possible embodiments of the present invention or the claims. As shown in FIG. 19, the example set of EC systems 1900 includes a plurality EC devices 1905 each including a plurality of layers coated on the substrate 1910 and busbars 1915 as similarly described herein. The dotted lines define the one or more perimeter edges of the respective EC devices 1905. In some aspects, the set of EC systems 1900 may constitute a patterned substrate as described herein.

Figure 20:
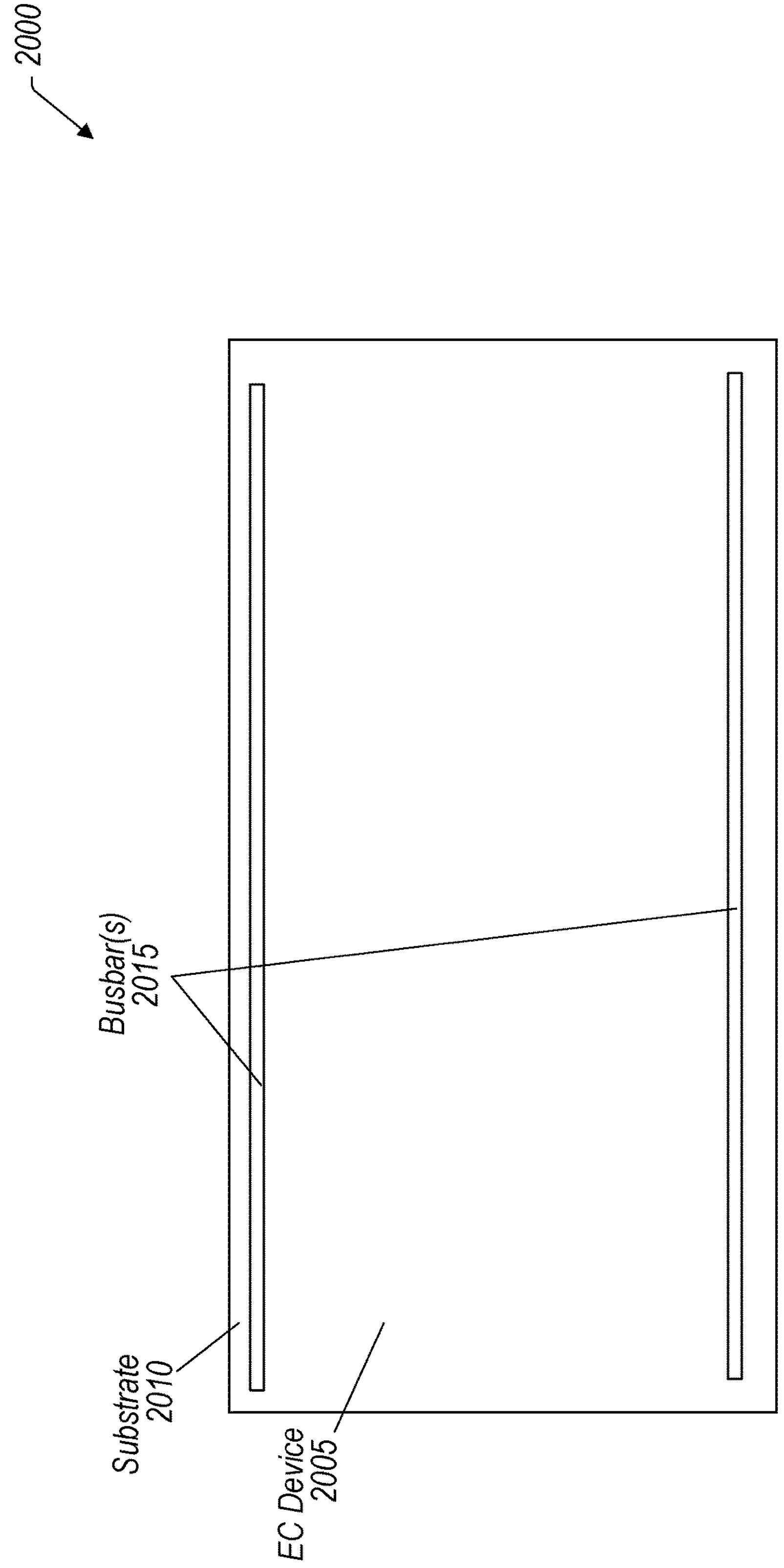
FIG. 20 illustrates a perspective view of an example EC system according to some aspects of this disclosure.

FIG. 20 illustrates a perspective view of an example EC system 2000 according to some aspects of this disclosure.

The EC system 2000 may include one or more same or similar features as the features described with respect to or illustrated in FIGS. 2, 3, 4, 5, 6, 7, 8, 9, 10, 11, 12, 13, 14, 15, 16, 17, 18, 19, 21, and 22. For example, the EC system 2000 may include and/or be manufactured using one or more same or similar features as the features described with respect to the method 200 described with respect to FIG. 2, the method 300 described with respect to FIG. 3, the method 400 described with respect to FIG. 4 and/or the method 1400 described with respect to FIG. 14. FIG. 20, as with the other included figures, is shown for illustrative purposes and does not limit either the possible embodiments of the present invention or the claims. As shown in FIG. 20, the example EC system 2000 includes an EC device 2005 including a plurality of layers coated on the substrate 2010 and busbars 2015 as similarly described herein. The EC device 2005 occupies nearly the entire surface of the substrate 2010. In some aspects, the EC system 2000 may constitute a universal substrate having a single substrate with a coating, at least one sacrificial busbar and at least one cut or laser line.

Figure 21:
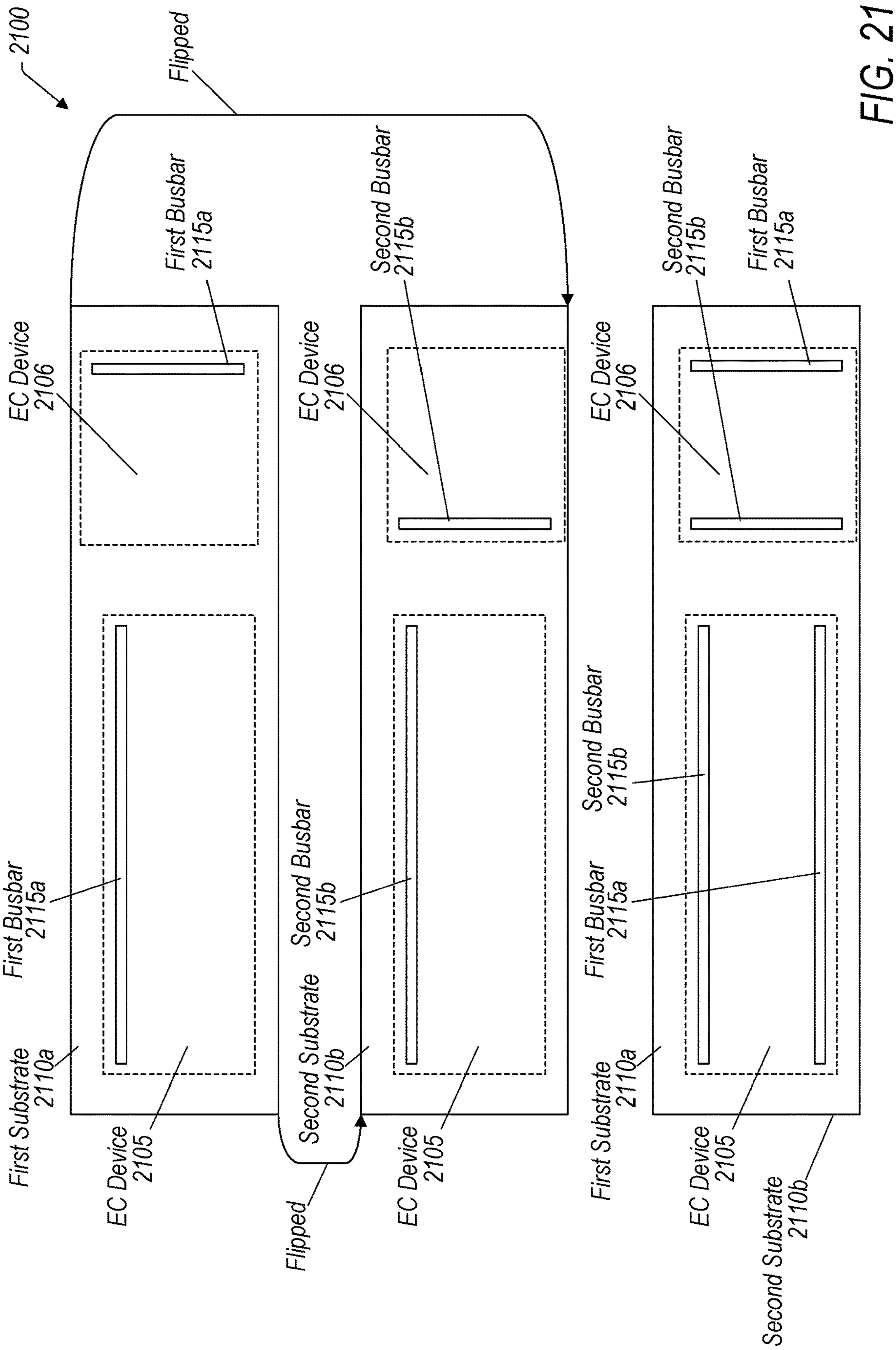
FIG. 21 illustrates a perspective view of an example set of EC systems according to some aspects of this disclosure.

FIG. 21 illustrates a perspective view of an example set of EC systems 2100 according to some aspects of this disclosure. The set of EC systems 2100 may include one or more same or similar features as the features described with respect to or illustrated in FIGS. 2, 3, 4, 5, 6, 7, 8, 9, 10, 11, 12, 13, 14, 15, 16, 17, 18, 19, 20, and 22. For example, the set of EC systems 2100 may include and/or be manufactured using one or more same or similar features as the features described with respect to the method 200 described with respect to FIG. 2, the method 300 described with respect to FIG. 3, the method 400 described with respect to FIG. 4 and/or the method 1400 described with respect to FIG. 14. FIG. 21, as with the other included figures, is shown for illustrative purposes and does not limit either the possible embodiments of the present invention or the claims. As shown in FIG. 21, the example set of EC systems 2100 includes a plurality EC devices including a first EC device 2105 and a second EC device 2106 each including a first busbar 2115*a* and a second busbar 2115*b* as similarly described herein. The dotted lines define the one or more perimeter edges of the respective EC devices 2105 and 2106. In some aspects, the set of EC systems 1900 may constitute a laminated patterned substrate having at least one EC device, busbars, and sacrificial busbars. The set of EC systems 2100 may be formed from two substrates: a first substrate 2110*a* and a second substrate 2110*b*. The first substrate 2110*b* may include half of the plurality of layers (e.g., a second TC layer, an EC electrode layer, and a IC layer) and a first busbar 2115*a* for each respective EC device and the second substrate 2110*b* may include the other half of the plurality of layers (e.g., a CE layer, a first TC layer, and an AR layer) and a second busbar 2115*b* for each respective EC device. The first substrate 2110*a* may be flipped at the corners over the second substrate 2110*b*, as shown in FIG. 21, to form the first EC device 2105 and the second EC device 2106 each having two busbars and the plurality of layers.

Figure 22:
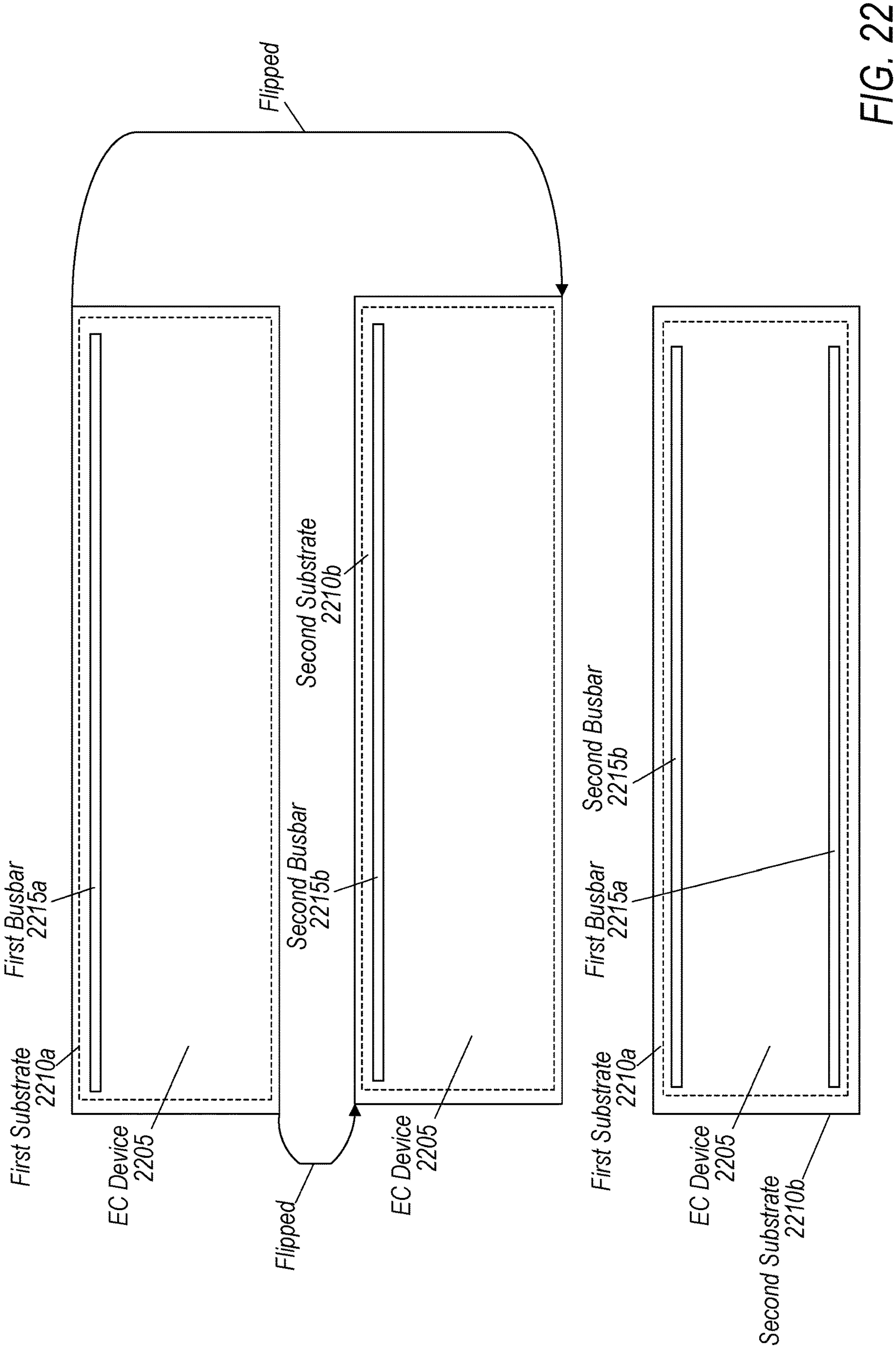
FIG. 22 illustrates a perspective view of an example EC system according to some aspects of this disclosure.

FIG. 22 illustrates a perspective view of an example EC system 2200 according to some aspects of this disclosure. The EC system 2200 may include one or more same or similar features as the features described with respect to or illustrated in FIGS. 2, 3, 4, 5, 6, 7, 8, 9, 10, 11, 12, 13, 14, 15, 16, 17, 18, 19, 20, and 21. For example, the EC system 2200 may include and/or be manufactured using one or more same or similar features as the features described with respect to the method 200 described with respect to FIG. 2, the method 300 described with respect to FIG. 3, the method 400 described with respect to FIG. 4 and/or the method 1400 described with respect to FIG. 14. FIG. 20, as with the other included figures, is shown for illustrative purposes and does not limit either the possible embodiments of the present invention or the claims. As shown in FIG. 22, the example EC system 2000 includes an EC device 2205 having a first busbar 2215*a* and a second busbar 2215*b*, as similarly described herein. The EC device 2205 occupies nearly the entire surface of the substrate 2010. In some aspects, the EC system 2200 may constitute a laminated universal substrate having two substrates: a first substrate 2210*a* and a second substrate 2210*b* and at least one sacrificial busbar. The first substrate 2210*b* may include half of the plurality of layers (e.g., a second TC layer, an EC electrode layer, and a IC layer) and the first busbar 2215*a* and the second substrate 2210*b* may include the other half of the plurality of layers (e.g., a CE layer, a first TC layer, and an AR layer) and the second busbar 2215*b*. The first substrate 2210*a* may be flipped at the corners over the second substrate 2210*b*, as shown in FIG. 22, to form the first EC device 2205 having two busbars and the plurality of layers.

In some aspects, a method is provided. The method includes coating a substrate with one or more layers for an electrochromic (EC) stack. The method also includes patterning at least one layer of the one or more layers on the substrate. Prior to shipping the substrate to another facility or prior to cutting the substrate into one or more EC devices, the patterning identifies one or more areas for forming respective EC devices of the one or more EC devices or for locating respective busbars for the one or more EC devices. In some aspects, the method further includes prior to shipping the substrate to the other facility or prior to cutting the substrate into the one or more EC devices, mounting the respective busbars for the one or more EC devices to the substrate. In some aspects, the method also includes after mounting the respective busbars to the substrate, individually electrically testing respective areas of the one or more areas. In some aspects, the respective areas of the one or more areas are individually electrically tested prior to shipping the substrate to the other facility or prior to cutting the substrate into the one or more EC devices. In some aspects, individually electrically testing comprises at least one of power cycling the respective areas of the one or more areas, testing the respective areas of the one or more areas for shorts, or repairing one or more shorts at the respective areas of the one or more areas. In some aspects, the method also includes after electrically testing the respective areas of the one or more areas and after shipping the substrate to the other facility identifying a perimeter edge of at least one area for forming a respective EC device, and cutting the substrate along the perimeter edge. In some aspects, the edge delete is performed using one or more laser cuts through the substrate. In some aspects, the method also includes after cutting the substrate along the perimeter edge, grinding the perimeter edge. In some aspects, grinding the perimeter edge comprises a polishing, two-pass grinding technique. In some aspects, grinding the perimeter edge comprises a "c" shape, two-pass course plus fine grinding technique. In some aspects, patterning includes performing one or more laser cuts through the at least one layer of the one or more layers on the substrate. In some aspects, the respective busbars comprise at least one of a temporary busbar or a permanent busbar. In some aspects, the EC stack comprises a first transparent conductive (TC) layer, a counter electrode (CE) layer, an EC electrode layer, and a second TC layer.

In some aspects, an apparatus is provided. The apparatus includes a substrate coated with one or more layers for an electrochromic (EC) stack. At least one layer of the one or more layers coated on the substrate is patterned to identify one or more areas for forming one or more respective EC devices. As a result of electrically testing the one or more areas for forming the one or more respective EC devices, the one or more areas comprise a different hue when the one or more areas are in a clear state compared to one or more remaining areas of the coated substrate. In some aspects, the at least one layer of the one or more layers coated on the substrate is patterned to locate respective busbars for individually electrically testing the one or more areas, the respective busbars mounted to the substrate at respective locations according to the pattern. In some aspects, the at least one layer of the one or more layers coated on the substrate is patterned such that the at least one layer of the one or more layers comprises one or more laser cuts extending at least partially therethrough. In some aspects, the respective busbars comprise a temporary busbar. In some aspects, the respective busbars comprise a permanent busbar. In some aspects, the EC stack comprises a first transparent conductive (TC) layer, a counter electrode (CE) layer, an EC electrode layer, and a second TC layer. In some aspects, at least some of the one or more remaining areas of the coated substrate are discarded when forming the one or more respective EC device from the one or more areas. In some aspects, the substrate is coated with a plurality of layers for the EC stack, and electrically testing the one or more areas for forming the one or more respective EC devices cause lithium ions to move to from one layer of the plurality of layers, to another layer of the plurality of layers, and remain in the other layer of the plurality of layers so that the one or more areas have the different hue when the one or more areas are in the clear state. In some aspects, at least one layer of the one or more layers coated on the substrate is patterned to identify a plurality of areas for forming respective EC devices, and as a result of electrically testing the plurality of areas for forming the respective EC devices, the plurality of areas comprises the different hue when the plurality of areas is in the clear state compared to the one or more remaining areas of the coated substrate. In some aspects, as a result of one or more short repairs to the patterned substrate, at least one layer of the one or more layers may include at least one hole therethrough.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A method, comprising:

coating a substrate with one or more layers for an electrochromic (EC) stack;

patterning at least one layer of the one or more layers on the substrate, wherein, prior to shipping the substrate to another facility or prior to cutting the substrate into one or more EC devices, the patterning of the at least one layer of the one or more layers on the substrate for the EC stack identifies:

one or more areas for forming respective EC devices of the one or more EC devices, or one or more areas for locating respective busbars for the one or more EC devices.

2. The method of claim 1, further comprising:

prior to shipping the substrate to the other facility or prior to cutting the substrate into the one or more EC devices, mounting the respective busbars for the one or more EC devices to the substrate.

3. The method of claim 2, further comprising:

after mounting the respective busbars to the substrate, individually electrically testing respective areas of the one or more areas.

4. The method of claim 3, wherein the respective areas of the one or more areas are individually electrically tested prior to shipping the substrate to the other facility or prior to cutting the substrate into the one or more EC devices.

5. The method of claim 4, wherein individually electrically testing comprises at least one of:

power cycling the respective areas of the one or more areas;

testing the respective areas of the one or more areas for shorts; or repairing one or more shorts at the respective areas of the one or more areas.

6. The method of claim 3, further comprising:

after electrically testing the respective areas of the one or more areas and after shipping the substrate to the other facility:

identifying a perimeter edge of at least one area for forming a respective EC device; and cutting the substrate along the perimeter edge.

7. The method of claim 6, wherein cutting the substrate along the perimeter edge comprises performing an edge delete through the substrate; and wherein the edge delete is performed using one or more laser cuts through the substrate.

8. The method of claim 7, further comprising:

after cutting the substrate along the perimeter edge, grinding the perimeter edge, wherein grinding the perimeter edge comprises a polishing, two-pass grinding technique.

9. The method of claim 7, wherein grinding the perimeter edge comprises a "c" shape, two-pass course plus fine grinding technique.

10. The method of claim 1, wherein patterning includes performing one or more laser cuts through the at least one layer of the one or more layers on the substrate.

11. The method of claim 1, wherein the respective busbars comprise at least one of a temporary busbar or a permanent busbar.

12. An apparatus comprising:

a substrate coated with one or more layers for an electrochromic (EC) stack, wherein at least one layer of the one or more layers coated on the substrate is patterned to identify one or more areas for forming one or more respective EC devices; and wherein, as a result of electrically testing the one or more areas for forming the one or more respective EC devices, the one or more areas comprise a different hue when the one or more areas are in a clear state compared to one or more remaining areas of the coated substrate.

13. The apparatus of claim 12, wherein the at least one layer of the one or more layers coated on the substrate is patterned to locate respective busbars for individually electrically testing the one or more areas, the respective busbars mounted to the substrate at respective locations according to the pattern.

14. The apparatus of claim 12, wherein the at least one layer of the one or more layers coated on the substrate is patterned such that the at least one layer of the one or more layers comprises one or more laser cuts extending at least partially therethrough.

15. The apparatus of claim 12, wherein the respective busbars comprise at least one of a temporary busbar or a permanent busbar.

16. The apparatus of claim 12, wherein the EC stack comprises:

a first transparent conductive (TC) layer;

a counter electrode (CE) layer;

an EC electrode layer; and a second TC layer.

17. The apparatus of claim 12, wherein at least some of the one or more remaining areas of the coated substrate are discarded when forming the one or more respective EC device from the one or more areas.

18. The apparatus of claim 12, wherein the substrate is coated with a plurality of layers for the EC stack, and wherein electrically testing the one or more areas for forming the one or more respective EC devices cause lithium ions to move to from one layer of the plurality of layers, to another layer of the plurality of layers, and remain in the other layer of the plurality of layers so that the one or more areas have the different hue when the one or more areas are in the clear state.

19. The apparatus of claim 12, wherein:

at least one layer of the one or more layers coated on the substrate is patterned to identify a plurality of areas for forming respective EC devices; and as a result of electrically testing the plurality of areas for forming the respective EC devices, the plurality of areas comprises the different hue when the plurality of areas is in the clear state compared to the one or more remaining areas of the coated substrate.

20. The apparatus of claim 12, wherein, as a result of one or more short repairs to the patterned substrate, at least one layer of the one or more layers may include at least one hole therethrough.

* * * * *